United States Patent
Yang

(10) Patent No.: US 11,272,234 B2
(45) Date of Patent: Mar. 8, 2022

(54) ELECTRONIC APPARATUS, SERVER AND METHOD OF CONTROLLING THE SAME

(71) Applicant: SAMSUNG ELECTRONICS CO., LTD., Suwon-si (KR)

(72) Inventor: Yongcheol Yang, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 156 days.

(21) Appl. No.: 16/700,553

(22) Filed: Dec. 2, 2019

(65) Prior Publication Data
US 2020/0186856 A1    Jun. 11, 2020

(30) Foreign Application Priority Data
Dec. 5, 2018 (KR) .................. 10-2018-0155196

(51) Int. Cl.
*H04N 21/254* (2011.01)
*H04L 29/06* (2006.01)
(Continued)

(52) U.S. Cl.
CPC ..... *H04N 21/2541* (2013.01); *H04L 63/0272* (2013.01); *H04L 63/0471* (2013.01);
(Continued)

(58) Field of Classification Search
CPC .......... H04N 21/2541; H04N 21/2347; H04N 21/26606; H04N 21/4405; H04N 21/222;
(Continued)

(56) References Cited

U.S. PATENT DOCUMENTS 6,714,649 B1 * 3/2004 Masuda ................. H04N 5/913
380/44
2004/0088552 A1 5/2004 Candelore
(Continued)

FOREIGN PATENT DOCUMENTS

KR    100874449 B1    12/2008
KR    10-1085575 B1   11/2011
(Continued)

OTHER PUBLICATIONS

Communication dated Aug. 26, 2020, from the European Patent Office in counterpart European Application No. 19212364.4.
(Continued)

*Primary Examiner* — Mohammad W Reza
(74) *Attorney, Agent, or Firm* — Sughrue Mion, PLLC

(57) ABSTRACT

Disclosed are an electronic apparatus, a server, and a method of controlling the same, the server including: a communicator configured to connect with an electronic apparatus and an external server; and a processor configured to: generate first encrypted information by encrypting first decryption information received from the electronic apparatus, the first decryption information for reproducing content, control the communicator to transmit, to the external server, the generated first encrypted information, generate second decryption information by decrypting second encrypted information received from the external server, the second encrypted information generated based on the first decryption information, and control the communicator transmit the generated second decryption information to the electronic apparatus to scramble the content by a scrambler of the electronic apparatus.

21 Claims, 11 Drawing Sheets

(51) Int. Cl.
*H04N 21/2347* (2011.01)
*H04N 21/266* (2011.01)
*H04N 21/4405* (2011.01)

(52) U.S. Cl.
CPC ... *H04N 21/2347* (2013.01); *H04N 21/26606* (2013.01); *H04N 21/4405* (2013.01)

(58) Field of Classification Search
CPC ......... H04N 21/4348; H04N 21/63775; H04N 21/6334; H04N 21/4353; H04N 21/2351; H04N 21/4623; H04N 21/4408; H04L 63/0272; H04L 63/0471; H04L 2463/101; H04L 63/0457; H04L 9/0822; H04L 2209/603; H04L 9/0894; H04L 2209/601; H04L 9/12; H04L 63/062
See application file for complete search history.

(56) References Cited

U.S. PATENT DOCUMENTS

| | | | |
|---|---|---|---|
| 2005/0069131 A1* | 3/2005 | de Jong | H04N 21/4405 380/239 |
| 2006/0123246 A1 | 6/2006 | Vantalon et al. | |
| 2007/0265973 A1* | 11/2007 | Kahn | G06F 21/10 705/57 |
| 2009/0028331 A1 | 1/2009 | Millar et al. | |
| 2014/0281537 A1 | 9/2014 | Okimoto et al. | |
| 2015/0229481 A1 | 8/2015 | Prince et al. | |
| 2020/0137439 A1* | 4/2020 | Yoshizawa | H04N 21/25816 |

FOREIGN PATENT DOCUMENTS

| | | |
|---|---|---|
| WO | 2010006290 A1 | 1/2010 |
| WO | 2012141501 A2 | 10/2012 |

OTHER PUBLICATIONS

International Search Report (PCT/ISA/210) and Written Opinion (PCT/ISA/237) from the International Searching Authority dated Mar. 23, 2020 in application No. PCT/KR2019/016893.
Communication dated Mar. 10, 2020 from the European Patent Office in application No. 19212364.4.

* cited by examiner

ELECTRONIC APPARATUS, SERVER AND METHOD OF CONTROLLING THE SAME

CROSS-REFERENCE TO RELATED APPLICATION(S)

This application is based on and claims priority under 35 U.S.C. § 119 to Korean Patent Application No. 10-2018-0155196, filed on Dec. 5, 2018, in the Korean Intellectual Property Office, the disclosure of which is incorporated by reference herein in its entirety.

BACKGROUND

1. Field

The disclosure relates to an electronic apparatus, a server, and a method of controlling the same, and more particularly to an electronic apparatus for providing content in a conditional access system (CAS), a server, and a method of controlling the same.

2. Description of the Related Art

A conditional access system (CAS) encrypts broadcasting content under various pay broadcasting service environments of an Internet protocol television (IPTV), digital cable broadcasting, satellite broadcasting, digital multimedia broadcasting (DMB), etc., to protect the content, thereby granting only an authenticated subscriber a normal access to paid content.

The CAS is divided into a transmitter (e.g., a CAS server or a CAS head-end) in which content is encrypted, i.e., scrambled, and a receiver (e.g., a CAS client) in which the encrypted content is received. The transmitter includes a scrambler for scrambling the content, and configurations for providing a digital rights management (DRM) service as a secure solution.

With recent expansion of a cloud-based service, there have been attempts to provide the DRM service in the way of a cloud.

In particular, it is burdensome for a hotel and the like small and medium-sized CAS environments to autonomously manage the DRM service as well as the scrambler. Therefore, providing at least some configurations in a public cloud that is managed by a service provider is advantageous in terms of costs and management.

The configurations of the CAS head-end exchange unencrypted data of a clear text form according to digital video broadcasting simulcrypt standards.

In a related art, communication between the configurations of the CAS head-end perform is performed within a local area network (e.g., an on-premises network) that is secured against the outside, and therefore there are no problems in security even though the data is transmitted and received as unencrypted.

However, when some configurations of the CAS head-end are serviced through the public cloud, a risk of hacking cannot be ruled out while data is transmitted and received according to the DVB simulcrypt standards, thereby causing a problem of difficulty in ensuring the security.

Further, compatibility with related art apparatuses, which comply with the DVB simulcrypt standards, needs to be taken into account in terms of security enhancement for solving the foregoing issues.

SUMMARY

Provided are an electronic apparatus, a server, and a method of controlling the same, for providing content in a conditional access system (CAS).

Additional aspects will be set forth in part in the description which follows and, in part, will be apparent from the description, or may be learned by practice of the presented embodiments.

In accordance with an aspect of the disclosure, a server includes: a communicator configured to connect with an electronic apparatus and an external server; and a processor configured to: generate first encrypted information by encrypting first decryption information received from the electronic apparatus, the first decryption information for reproducing content, control the communicator to transmit, to the external server, the generated first encrypted information, generate second decryption information by decrypting second encrypted information received from the external server, the second encrypted information generated based on the first decryption information, and control the communicator transmit the generated second decryption information to the electronic apparatus to scramble the content by a scrambler of the electronic apparatus.

The first decryption information may include a control word for scrambling the content in the scrambler; and the processor may be further configured to receive, via the communicator, the first decryption information output from a simulcrypt synchronizer of the electronic apparatus.

The processor may be further configured to add a secure tunnel client to the server to give the server an access, through the communicator, to a secure tunnel service executed in the external server.

A socket listener may be added to the secure tunnel client, and may serve as a virtual server for the simulcrypt synchronizer.

The second decryption information may include an entitlement control message with information to extract the control word; and the processor may be further configured to control to output, via the communicator, the second decryption information to the simulcrypt synchronizer.

The processor may be further configured to generate third decryption information by decrypting third encrypted information received from the external server, and control the communicator to transmit, to the electronic apparatus, the generated third decryption information.

The third decryption information may include an entitlement management message with information to decrypt the second decryption information; and the processor may be further configured to control to output, via the communicator, the third decryption information to a multiplexer of the electronic apparatus.

A socket listener may be added to the secure tunnel client, and may serve as a virtual server for the multiplexer.

In accordance with another aspect of the disclosure, a server includes: a communicator configured to connect with an external server; and a processor configured to: receive, from the external server via the communicator, first encrypted information, which is generated by encrypting first decryption information for reproducing content, extract the first decryption information by decrypting the received first encrypted information, generate second decryption information based on the extracted first decryption information, generate second encrypted information by encrypting the second decryption information, and control the communicator to transmit the generated second encrypted information to the external server to scramble the content.

The first decryption information may include a control word to scramble the content in a scrambler; the second decryption information may include an entitlement control message with information to extract the control word; and the processor may be further configured to output the extracted first decryption information to an entitlement control message generator that generates the entitlement control message based on the control word.

The processor may be further configured to execute a secure tunnel service in the server to give the server an access, through the communicator, to a secure tunnel client added to the external server.

A socket listener may be added to the secure tunnel service, and may serve as a virtual server for the entitlement control message generator.

The processor may be further configured to: generate third encrypted information by encrypting third decryption information; and control the communicator to transmit, to the external server, the generated third encrypted information.

The third decryption information may include an entitlement management message with information to decrypt the second decryption information; and the processor may be further configured to obtain the entitlement management message from an entitlement management message generator.

A socket listener may be added to the secure tunnel service, and may serve as a virtual server for the entitlement management message generator.

In accordance with another aspect of the disclosure, an electronic apparatus includes: a scrambler; a communicator configured to connect with a server; and a processor configured to: generate first encrypted information by encrypting first decryption information for reproducing content, control the communicator to transmit, to the server, the generated first encrypted information, generate second decryption information by decrypting second encrypted information received from the server, the second encrypted information generated based on the first decryption information, and control the scrambler to scramble the content based on the generated second decryption information.

In accordance with another aspect of the disclosure, a server includes: a communicator configured to connect with an electronic apparatus; and a processor configured to: receive, from the electronic apparatus via the communicator, first encrypted information, which is generated by encrypting first decryption information for reproducing content, extract the first decryption information by decrypting the received first encrypted information, generate second decryption information based on the extracted first decryption information, generate second encrypted information by encrypting the second decryption information, and control the communicator to transmit, to the electronic apparatus, the generated second encrypted information to scramble the content by a scrambler of the electronic apparatus.

In accordance with another aspect of the disclosure, a method of controlling a server includes: generating first encrypted information by encrypting first decryption information received from an electronic apparatus comprising a scrambler, the first decryption information for reproducing content; transmitting, to an external server, the generated first encrypted information; generating second decryption information by decrypting second encrypted information received from the external server, the second encrypted information generated based on the first decryption information; and transmitting the generated second decryption information to the electronic apparatus to scramble the content.

In accordance with another aspect of the disclosure, a method of controlling a server includes: receiving, from an external server, first encrypted information generated by encrypting first decryption information for reproducing content; extracting the first decryption information by decrypting the received first encrypted information; generating second decryption information based on the extracted first decryption information; generating second encrypted information by encrypting the second decryption information; and transmitting the generated second encrypted information to the external server to scramble the content.

In accordance with another aspect of the disclosure, a method of controlling an electronic apparatus includes: generating first encrypted information by encrypting first decryption information for reproducing content scrambled in a scrambler; transmitting, to a server, the generated first encrypted information; generating second decryption information by decrypting second encrypted information received from the server, the second encrypted information generated based on the first decryption information; and controlling the scrambler to scramble the content based on the generated second decryption information.

In accordance with another aspect of the disclosure, a method of controlling a server includes: receiving, from an electronic apparatus comprising a scrambler, first encrypted information generated by encrypting first decryption information for reproducing content; extracting the first decryption information by decrypting the received first encrypted information; generating second decryption information based on the extracted first decryption information; generating second encrypted information by encrypting the second decryption information; and transmitting the generated second encrypted information to the electronic apparatus to scramble the content.

The first decryption information may include a control word to scramble the content; and the second decryption information may include an entitlement control message with information to extract the control word.

In accordance with another aspect of the disclosure, a non-transitory computer-readable recording medium has recorded thereon instructions executable by at least one processor of an electronic device to cause the at least one processor to perform a method including: generating first encrypted information by encrypting first decryption information for reproducing content scrambled in a scrambler; controlling to transmit, to a server, the generated first encrypted information; generating second decryption information by decrypting second encrypted information received from the server, the second encrypted information generated based on the first decryption information; and controlling the scrambler to scramble the content based on the generated second decryption information.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
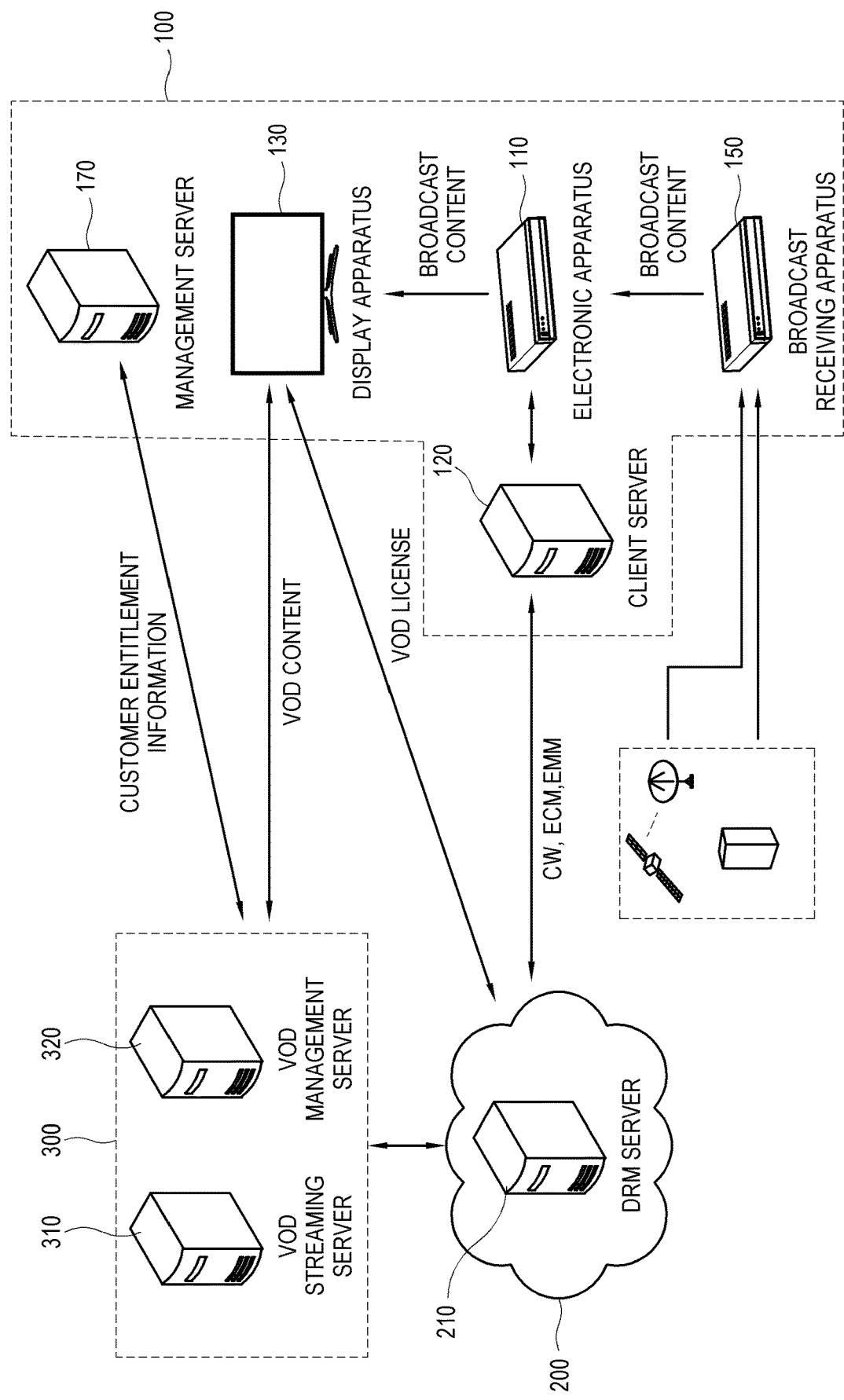
FIG. 1 illustrates overall configurations of a conditional access system (CAS) according to an embodiment.

Below, embodiments are described in detail with reference to accompanying drawings. In the drawings, like numerals or symbols refer to like elements having substantially the same function, and the size of each element may be exaggerated for clarity and convenience of description. However, the configurations and functions illustrated in the following embodiments are not construed as limiting the present inventive concept(s) and the key configurations and functions.

In the following description, the terms "first," "second," etc., are only used to distinguish one element from another, and singular forms are intended to include plural forms unless otherwise mentioned contextually. In the following description, it will be understood that terms "comprise," "include," "have," etc., do not preclude the presence or addition of one or more other features, numbers, steps, operation, elements, components or combinations thereof. In addition, a "module" or a "portion" may perform at least one function or operation, be achieved by hardware, software or a combination of hardware and software, and be integrated into at least one module. In the disclosure, at least one among a plurality of elements refers to not only all the plurality of elements but also both each one of the plurality of elements excluding the other elements and a combination thereof.

Hereinafter, it is understood that expressions such as "at least one of" when preceding a list of elements, modify the entire list of elements and do not modify the individual elements of the list. For example, the expressions "at least one of [A], [B], and [C]" or "at least one of [A], [B], or [C]" means only A, only B, only C, A and B, B and C, A and C, or A, B, and C.

An aspect of the disclosure provides an electronic apparatus, a server, and a method of controlling the same, in which communication security is ensured even while some configurations of a conditional access system (CAS) headend are serviced in the way of a cloud.

Another aspect of the disclosure provides an electronic apparatus, a server, and a method of controlling the same, in which data is transmitted and received complying with digital video broadcasting (DVB) Simulcrypt standards to thereby enhance compatibility with related art apparatuses.

FIG. 1 illustrates overall configurations of a conditional access system (CAS) according to an embodiment.

FIG. 1 shows an example of small and medium-sized CAS environments such as a hotel, a cruise, an airplane, a hospital, a stadium, etc. However, the CAS environments according to the disclosure are not limited to those shown in FIG. 1, and one or more configurations, components, etc., may be added or excluded.

As shown in FIG. 1, the CAS according to an embodiment includes a plurality of communication networks 100, 200 and 300 distinguished from one another, and apparatuses respectively provided in the communication networks 100, 200 and 300. The plurality of communication networks 100, 200 and 300 can communicate with one another, and are respectively managed by different main agents.

A first communication network 100 may be provided in a small and medium-sized site such as a hotel, a cruise, an airplane, a hospital, a stadium, etc., and embodied as a local area network (LAN) that is secured against the outside, i.e., as an on-premises form.

The first communication network 100 may be managed by a business operator or commissioned manager of the corresponding site.

Hereinafter, an example is described in which the first communication network 100 is built in a hotel site and a main agent of managing this network is a hotel operator. However, the CAS environment according to the disclosure is not limited to this example (i.e., a hotel and hotel operator), and thus the first communication network 100 may be managed by another business operator, for example, an airlines company, etc.

In the first communication network 100, there may be provided an electronic apparatus 110 including a scrambler 111 (see FIG. 2) for scrambling content, a display apparatus 130 displaying an image based on content by descrambling the content received from the electronic apparatus 110, a broadcast receiving apparatus 150 receiving broadcast content through a satellite, a cable, etc., and providing the broadcast content to the electronic apparatus 110, and a management server 107.

The display apparatus 130 displays an image by processing content provided from the electronic apparatus 110 based on a preset process. For example, the display apparatus 130 may be embodied as a television (TV) that displays broadcast content.

The electronic apparatus 110 according to an embodiment scrambles content with a control word (CW) and provides the scrambled content to the display apparatus 130, and the display apparatus 130 descrambles the scrambled content based on the CW to thereby reproduce the content and display a corresponding image. The CW may be transmitted to the display apparatus 130 as included in data, e.g., an entitlement control message (ECM), separated from the content.

An image source that provides content to the display apparatus 130 is not limited to the electronic apparatus 110, and may for example include a video on demand (VOD) streaming server 310.

The broadcast receiving apparatus 150 provides the broadcast content, which is received from a transmitter of a broadcasting station, to the electronic apparatus 110. The broadcast receiving apparatus 150 may for example wirelessly receive a radio frequency (RF) signal, e.g., a broadcast signal from the broadcasting station. To this end, the broadcast receiving apparatus 150 may further include an antenna for receiving a broadcast signal, and a tuner for tuning to a channel according to the broadcast signals. The broadcast receiving apparatus 150 may receive a broadcast signal through at least one of a terrestrial wave, a cable or a satellite.

The management server 170 may be embodied as a hotel management system, e.g., a property management system (PMS) that performs a management function between a front desk and a back office.

According to an embodiment, the first communication network 100 may include a client server 120 placed between the electronic apparatus 110 and a digital rights management (DRM) server 210 of a second communication network 200 (described below). Here, the client server 120 relays communication between the electronic apparatus 110 and the DRM server 210, and the client server 120 and the DRM server 210 exchange data encrypted based on a predetermined secure protocol.

Alternatively, the first communication network 100 may not separately include the client server 120, and the DRM server 210 and the electronic apparatus 110 may perform direct communication with each other. In this case, the electronic apparatus 110 and the DRM server 210 exchange data encrypted based on a predetermined secure protocol.

The second communication network 200 is managed by a DRM solution business that provides the DRM service. The second communication network 200 is embodied in the form of a cloud accessible through the public Internet.

In the second communication network 200, there is provided the DRM server 210 that provides a license for content. According to an embodiment, the second communication network 200 may additionally include an application server that provides an application of the DRM solution business.

The DRM server 210 receives the CW, which is used in scrambling the content, from the electronic apparatus 110 or the client server 120. Here, the DRM server 210 may further receive an access criteria (AC) to a broadcast program of a predetermined channel.

The DRM server 210 includes an ECM generator (ECMG) 211 (see FIG. 2) for generating an ECM including information for extracting the received CW at the display apparatus 130, and an entitlement management message generator (EMMG) 212 (see FIG. 2) for generating an entitlement management message (EMM) including information for managing a subscriber and information for decrypting the ECM.

The ECM and the EMM generated in the DRM server 210 are provided to the electronic apparatus 110.

According to an embodiment, the ECM and the EMM are provided to the electronic apparatus 110 through the client server 120, and the DRM server 210 and the client server 120 exchange the CW, the AC, the ECM and the EMM as the encrypted data/message with each other. The DRM server 210 is capable of communicating with a plurality of client servers 120.

Alternatively, the ECM and the EMM are directly provided to the electronic apparatus 110, and the DRM server 210 and the electronic apparatus 110 exchange the CW, the AC, the ECM and the EMM as the encrypted data/message with each other. The DRM server 210 is capable of communicating with a plurality of electronic apparatus 110.

According to an embodiment, the DRM server 210 may further transmit a VOD license for VOD content to the display apparatus 130 so that the display apparatus 130 can reproduce the VOD content.

A third communication network 300 may be provided in a system integrator (SI) business site or a media operator that provides a VOD service, and may be embodied as a LAN, i.e., an on-premises form that is secured against the outside.

The third communication network 300 is managed by the media operator or the SI business.

The third communication network 300 includes the VOD streaming server 310, and a VOD management server 320. The VOD management server 320 may be provided as a server for managing VOD content, and may be configured to store key information about predetermined VOD content. According to an embodiment, the third communication network 300 may additionally include an application server that provides an application of the SI business.

According to an embodiment, the VOD management server 320 may receive customer entitlement information from a management server 170, so that the VOD streaming server 310 can selectively provide the VOD content to the display apparatus 130 based on the entitlement of a user (or a customer) that makes a request for the VOD content.

In the CAS according to an embodiment, the electronic apparatus 110 performing scrambling and the DRM server 210 generating the ECM/EMM are embodied to interwork with each other based on a DVB simulcrypt protocol.

Figure 2:
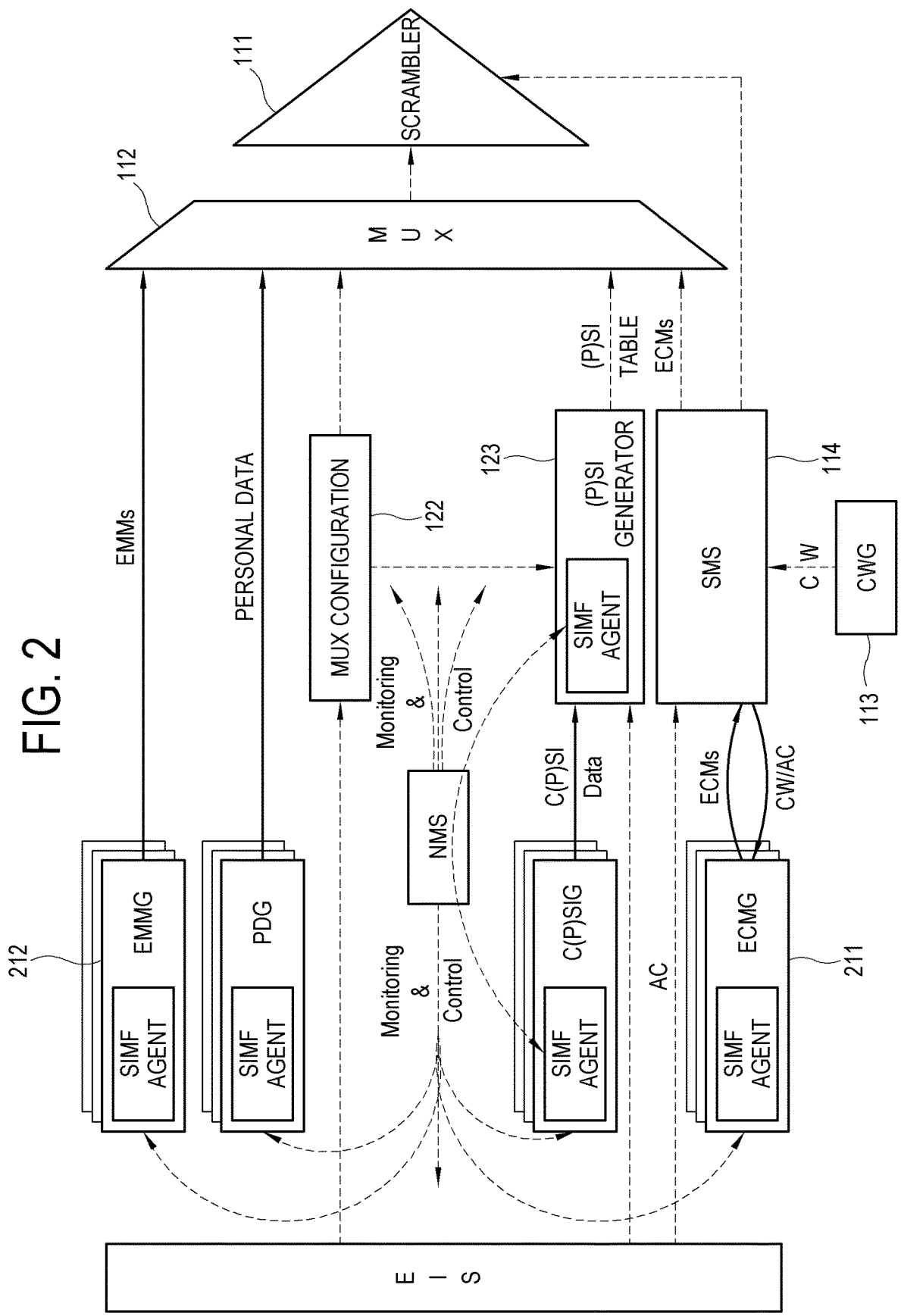
FIG. 2 illustrates communication protocols between a digital rights management (DRM) server and an electronic apparatus according to an embodiment.

FIG. 2 illustrates communication protocols between a DRM server 210 and an electronic apparatus 110 according to an embodiment.

The structure shown in FIG. 2 shows head-end elements disclosed in the simulcrypt protocol.

The CW is used as a key for encrypting content by a scrambler 111 provided in the electronic apparatus 110. The CW is randomly generated by a control word generator (CWG) 113 and transmitted to a simulcrypt synchronizer (SCS) 114.

The SCS 114 generates the AC for a broadcast program/content of a predetermined channel, and transmits the CW and the AC to the ECMG 211.

The SCS 114 controls so that the CW is transmitted even to the scrambler 111. The CW is used as a key for encrypting content output from the scrambler 111.

The ECMG 211 generates the ECM based on the received CW and AC. The generated ECM includes information for extracting the CW at the display apparatus 130. The ECM may further include conditional information about a subscriber allowed to view a certain channel or a certain program/content based on the AC.

The ECM generated in the ECMG 211 is transmitted to a multiplexer (MUX) 112.

The EMMG 212 generates the EMM including information for managing a subscriber and information (or a value) for decrypting the ECM. The EMM generated in the EMMG 212 is transmitted to the MUX 112.

A MUX configuration 122 manages setting information such as transmission schedules of messages, etc. Program specific information (PSI) and service information (SI) includes information for allowing a receiving side, i.e., the display apparatus 130, to distinguish among broadcast service information, audio and video, and is generated by a PSI and/or SI generator 123 and transmitted to the MUX 112.

The SCS 114 selects a necessary value based on time, and performs scheduling so that content can be smoothly reproduced without freezing due to a key calculation or the like at the receiving side.

The MUX 112 multiplexes the received ECMs, EMMs, (P)SI tales, and multimedia packets to output a signal. This signal may be transmitted from the electronic apparatus 110 to the display apparatus 130.

Below, embodiments in which the system is configured to provide a CAS service based on a DVB Simulcrypt Protocol and the data/message is transmitted and received, are described.

Figure 3:
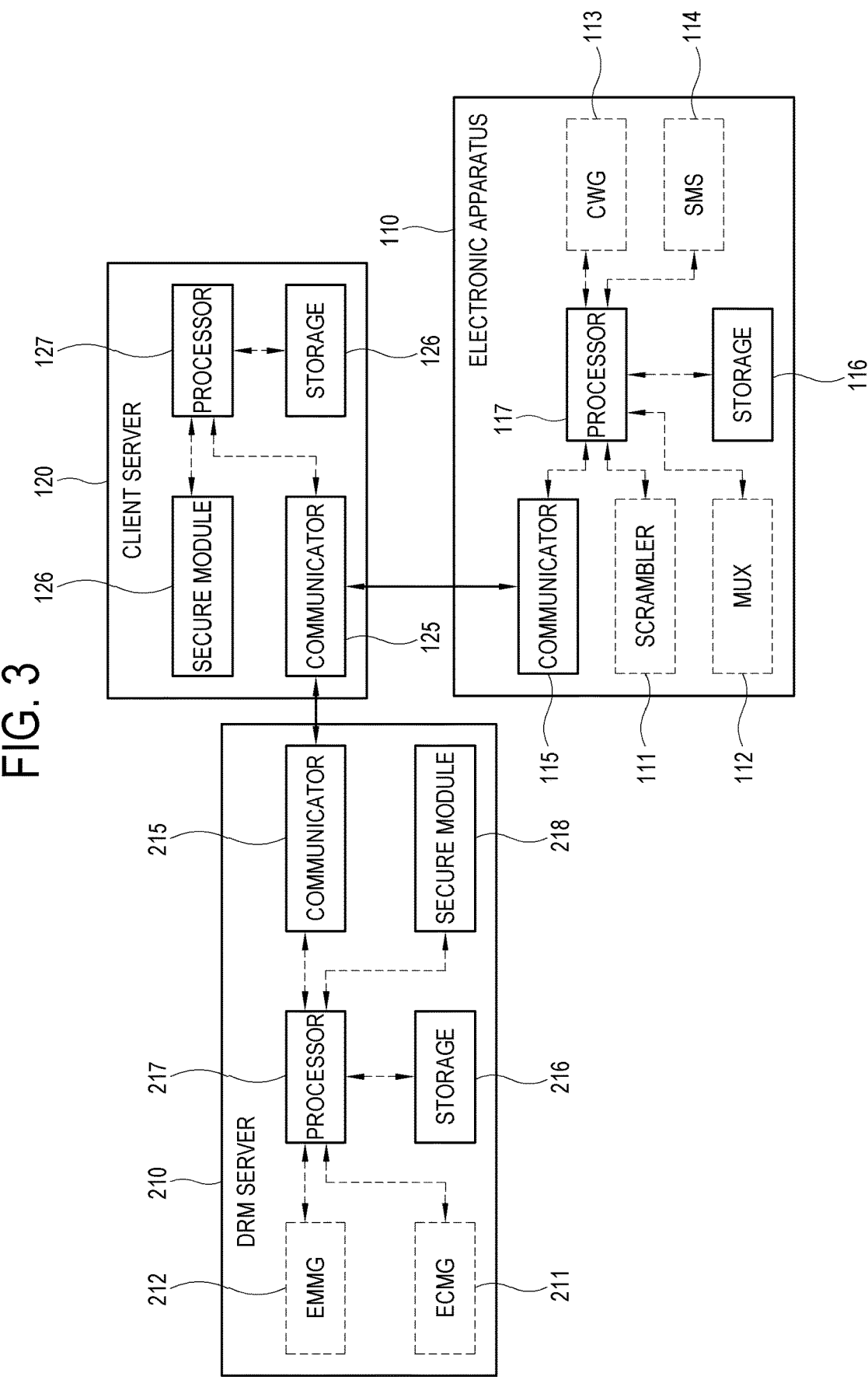
FIG. 3 is a block diagram of a system providing a CAS service according to a first embodiment.

FIG. 3 is a block diagram of a system providing a CAS service according to a first embodiment.

As shown in FIG. 3, the system according to the first embodiment includes the electronic apparatus 110, the client server 120, and the DRM server 210.

In the first embodiment, the client server 120 may relay communication between the electronic apparatus 110 and the DRM server 210.

According to the first embodiment, the client server 120 and the DRM server 210 are respectively provided with built-in secure modules 128 and 218, so that the client server 120 can serve as a secure communication agent and the DRM server 210 can serve as a secure communication service. The secure communication service and the secure communication agent form a pair to provide a secure tunnel service (described below).

As described above, the secure communication service is added to the area of the DRM server 210, and the secure communication agent is added to the area of the client server 120, so that the client server 120 can access the secure communication service executed in the DRM server 210 through the communicator 125.

As described above with reference to FIG. 1, according to the first embodiment, the electronic apparatus 110 including the scrambler 111 and the client server 120 are provided in the LAN, i.e., the first communication network 100 embodied as the on-premises network, and the DRM server 210 is provided in the second communication network 200 embodied as the cloud network.

Therefore, the electronic apparatus 110 and the client server 120 can freely communicate and exchange data with each other under the environment secured against the outside.

The electronic apparatus 110 includes the scrambler 111, the MUX 112, the CWG 113, and the SCS 114. These elements operate and function as described above with reference to FIG. 2.

FIG. 3 shows that the elements for providing content encrypted in the CAS are provided in the electronic apparatus 100 performing the scrambling. However, it is understood that one or more other embodiments are not limited thereto. For example, at least one among the MUX 112, the CWG 113 and the SCS 114 may be provided in the client server 120. Further, another element (or other elements) of the CAS described with reference to FIG. 2 may be provided in the electronic apparatus 110 or the client server 120.

The electronic apparatus 110, as shown in FIG. 3, includes a communicator 115, a storage 116 and a processor 117.

The communicator 115 performs communication with the client server 120. The communicator 115 may also perform communication with the display apparatus 130 and the broadcast receiving apparatus 150 shown in FIG. 1.

According to an embodiment, the electronic apparatus 110 and the client server 120 may be embodied to communicate with each other through a leased line of the first communication network 100.

The communicator 115 may be embodied by a communication circuitry including communication modules (a S/W module, a chip, etc.) corresponding to a predetermined communication protocol.

The storage 116 may be configured to store various pieces of data of the electronic apparatus 110.

The storage 116 may be embodied by a nonvolatile memory (or a writable memory) that can retain data even though the electronic apparatus 110 is powered off, and mirror changes. The storage 116 may include at least one among a hard disk drive (HDD), a flash memory, an electrically programmable read only memory (EPROM) or an electrically erasable and programmable ROM (EEPROM).

The storage 116 may further include a volatile memory such as a random access memory (RAM), and the volatile memory may include a dynamic RAM (DRAM) or static RAM (SRAM), of which reading or writing speed for the electronic apparatus 110 is faster than that of the RAM. In other words, the term "storage" as used herein includes not only nonvolatile memory but also volatile memory, a cache memory provided in the processor 117, a memory card (e.g., a micro SD card, a memory stick, etc.) mountable to the electronic apparatus 110 through a connector.

Data stored in the storage 116 may, for example, include not only an operating system (OS) for driving the electronic apparatus 110, but also various applications executable on the OS. The storage 116 may be configured to further store a signal or data input/output corresponding to operation of elements under control of the processor 117.

The processor 117 performs control to operate general elements of the electronic apparatus 110.

Specifically, the processor 117 scrambles content with the CW through the elements of the CAS including the scrambler 111, the MUX 112, the CWG 113, and the SCS 114, and controls the communicator 115 to output a signal including the scrambled content, the ECM and the EMM to the display apparatus 130. Here, the EMM may not be output together with the content but previously transmitted to the display apparatus 130, so that the display apparatus 130 can retain the EMM.

The display apparatus 130 may obtain the content, the ECM and the EMM scrambled with the CW by demultiplexing the signal received from the electronic apparatus 110.

The display apparatus 130 extracts the CW from the obtained ECM, and descrambles the scrambled content with the extracted CW, thereby reproducing the content and displaying a corresponding image. Here, the display apparatus 130 obtains a value for decrypting the ECM from the EMM.

Further, the display apparatus 130 may obtain subscriber management information from the EMM, and identify a user's entitlement to certain content. Here, when the EMM is not received together with the content but previously received in the display apparatus 130, the display apparatus 130 can identify a user's entitlement based on the retained EMM.

The CW refers to decryption information used in reproducing content at the receiving side, e.g., at the display apparatus 130, and is also referred to as first decryption information. According to an embodiment, the first decryption information may include the AC as well as the CW.

Further, the ECM refers to decryption information used in extracting the CW, i.e., the first decryption information at the display apparatus 130, and is also referred to as second decryption information. The EMM refers to decryption information used in obtaining the ECM, i.e., the second decryption information at the display apparatus 130, and is also referred to as third decryption information.

The processor 117 includes at least one universal processor that loads at least a part of a control program from a nonvolatile memory, in which the control program is installed, to a volatile memory, and executes the loaded control program, and may for example be actualized by a central processing unit (CPU), an application processor (AP), or a microprocessor.

The processor 117 may include a single core, a dual core, a triple core, a quad core, and the like multiple core. The processor may include a plurality of processors, for example, a main processor and a sub processor that operates in a sleep mode (during which only standby power is supplied without operation of the display apparatus 130). Further, the processor, the ROM, and the RAM may be connected to one another through an internal bus, and the ROM and the RAM belong to the storage 150.

The client server 120, as shown in FIG. 3, includes the communicator 125, a storage 126 and a processor 127 (e.g., at least one processor).

The communicator 125 performs communication with the electronic apparatus 110 or the DRM server 210.

According to an embodiment, the electronic apparatus 110 and the client server 120 are embodied to perform communication through a leased line secured against the outside and forming or included in the first communication network 100.

There are no limits to the line through which the client server 120 and the DRM server 210 can perform communication, and alternatively a public line or dedicated lines provided by various service businesses may be used in communication between the client server 120 and the DRM server 210.

The communicator 125 may be embodied as a communication circuitry including communication modules (e.g., a S/W module, a chip, etc.) corresponding to various communication protocols.

According to the first embodiment, the client server 120, as shown in FIG. 3, includes a secure module 128.

The secure module 128 encrypts data transmitted to and received from the external server, e.g., the DRM server 210. Here, the data transmitted and received as encrypted data includes the CW, the AC, the ECM, the EMM, etc.

The secure module 128 forms a secure communication channel between the client server 120 and the DRM server 210, thereby exchanging the encrypted data with a communicator 215 of the DRM server 210 (described below) through the communicator 125.

According to an embodiment, the secure module 128 forms the secure communication channel based on a predetermined protocol, so that secured access can be achieved in the communicator 125, thereby allowing the communicator 125 to transmit and receive the encrypted data.

There are no limits to the kinds of secure protocols according to the disclosure. For example, a secure shell (SSH) tunnel for executing a secure tunnel service that forms a secure communication channel may be used. Alternatively, the secure communication channel may use a virtual private network (VPN) tunnel, etc.

The secure module 128 may be embodied as an application or the like software module, and perform an operation to form the secure communication channel together with the DRM server 210 when executed by the processor 127. Therefore, it will be appreciated that the below described operation of the secure module 128 is performed by the processor 127.

The storage 126 is configured to store various pieces of data of the client server 120. The storage 126 may be equivalent or similar to the storage 116 of the electronic apparatus 110.

The data stored in the storage 126 includes an OS for driving the client server 120, and various applications executable on the OS.

According to an embodiment, a secure application based on a predetermined secure protocol is stored and installed in the storage 126, so that the secure module 128 can operate as the installed application is executed.

The processor 127 performs control to operate general elements of the client server 120. The processor 127 may be equivalent or similar to the processor 117 of the electronic apparatus 110.

Specifically, the processor 127 receives the first decryption information CW from the SCS 114, and controls the secure module 128 to generate the first encrypted information Encrypted CW by encrypting the received first decryption information CW. Here, the first decryption information output from the SCS 114 may further include the AC, and the processor 127 may generate the first encrypted information Encrypted CW/AC by encrypting the first decryption information CW/AC.

The processor 127 controls the communicator 125 to transmit the generated first encrypted information Encrypted CW/AC to the external server, i.e., the DRM server 210.

The processor 127 controls the communicator 115 to receive the second encrypted information Encrypted ECM, generated based on the first decryption information CW/AC, from the DRM server 210.

The processor 127 controls the secure module 128 to decrypt the second encrypted information Encrypted ECM received from the external server, i.e., the DRM server 210, and to generate the second decryption information ECM by decrypting the second encrypted information Encrypted ECM.

Further, the processor 127 controls the communicator 125 to receive the third encrypted information Encrypted EMM from the DRM server 210.

The processor 127 controls the secure module 128 to decrypt the third encrypted information Encrypted EMM received from the external server, i.e., the DRM server 210, and generate the third decryption information EMM by decrypting the third encrypted information Encrypted EMM.

The processor 127 may control the communicator 125 to transmit and receive the first encrypted information Encrypted CW, the second encrypted information Encrypted ECM, and the third encrypted information Encrypted EMM between the client server 120 and the DRM server 210 through the secure communication channel formed by the operation of the secure module 128.

The DRM server 210 includes the ECMG 211 and the EMMG 212. The operations/roles of these elements are the same as or similar to those described with reference to FIG. 2.

The DRM server 210, as shown in FIG. 3, includes the communicator 215, a storage 216 and a processor 217.

The communicator 215 performs communication with the client server 120.

There are no limits to the line through which the client server 120 and the DRM server 210 can perform communication, and alternatively a public line or dedicated lines provided by various service businesses may be used in communication between the client server 120 and the DRM server 210.

The communicator 215 may be embodied as a communication circuitry including communication modules (e.g., a S/W module, a chip, etc.) corresponding various communication protocols.

According to the first embodiment, the DRM server 210, as shown in FIG. 3, includes the secure module 218.

The secure module 218 encrypts data transmitted to and received from the external server, i.e., the client server 120. Here, the data transmitted and received as encrypted includes the CW, the AC, the ECM, the EMM, etc.

The secure module 218 forms a secure communication channel between the DRM server 210 and the client server 120, thereby exchanging the encrypted data with the communicator 125 of the client server 120 through the communicator 215.

According to an embodiment, the secure module 218 forms the secure communication channel based on a predetermined protocol, so that secured access can be achieved in the communicator 215, thereby allowing the communicator 215 to transmit and receive the encrypted data.

There are no limits to the kinds of secure protocols according to the disclosure. For example, an SSH tunnel for executing the secure tunnel service that forms the secure communication channel may be used. Alternatively, the secure communication channel may use a VPN tunnel.

The secure module 218 may be embodied as an application or the like software module, and performs an operation to form the secure communication channel together with the client server 120 when executed by the processor 217. Therefore, it will be appreciated that the below described operation of the secure module 218 is performed by the processor 217.

The storage 216 is configured to store various pieces of data of the DRM server 210. The storage 216 may be equivalent or similar to the storage 116 of the electronic apparatus 110.

The data stored in the storage 216 includes an OS for driving the DRM server 210, and various applications executable on the OS.

According to an embodiment, a secure application based on a predetermined secure protocol is stored and installed in the storage 216, so that the secure module 218 can operate as the installed application is executed.

The processor 217 performs control to operate general elements of the DRM server 210. The processor 217 may be equivalent or similar to the processor 117 of the electronic apparatus 110.

Specifically, the processor 217 controls the communicator 215 to receive the first encrypted information Encrypted CW/AC from the client server 120.

The processor 217 controls the secure module 218 to decrypt the first encrypted information Encrypted CW/AC received from the external server, i.e., the client server 120, and generates the first decryption information CW/AC by decrypting the first encrypted information Encrypted CW/AC.

The processor 217 controls the ECMG 211 to generate the second decryption information ECM based on the first decryption information CW/AC.

The processor 217 controls the secure module 218 to encrypt the second decryption information ECM generated by the ECMG 211, and generate the second encrypted information Encrypted ECM.

The processor 217 controls the communicator 215 to transmit the generated second encrypted information Encrypted ECM to the external server, i.e., the client server 120.

Further, the processor 217 controls the EMMG 212 to generate the third decryption information EMM.

The processor 217 controls the secure module 218 to encrypt the third decryption information EMM generated by the EMMG 212, and generate the third encrypted information Encrypted EMM.

The processor 217 controls the communicator 215 to transmit the generated third encrypted information Encrypted EMM to the external server, i.e., the client server 120.

The processor 217 may control the communicator 215 to transmit and receive the first encrypted information Encrypted CW, the second encrypted information Encrypted ECM, and the third encrypted information Encrypted EMM between the DRM server 210 and the client server 210 through the secure communication channel formed by the operation of the secure module 218.

FIGS. 4 to 7 illustrate a method of controlling the system with the foregoing configuration according to the first embodiment.

First, operations related to transmission and reception of the first decryption information CW/AC and the second decryption information ECM according to the first embodiment are described with reference to FIGS. 4 and 5. FIG. 5 is applicable to not only the first embodiment, but also a second embodiment described below.

Figure 4:
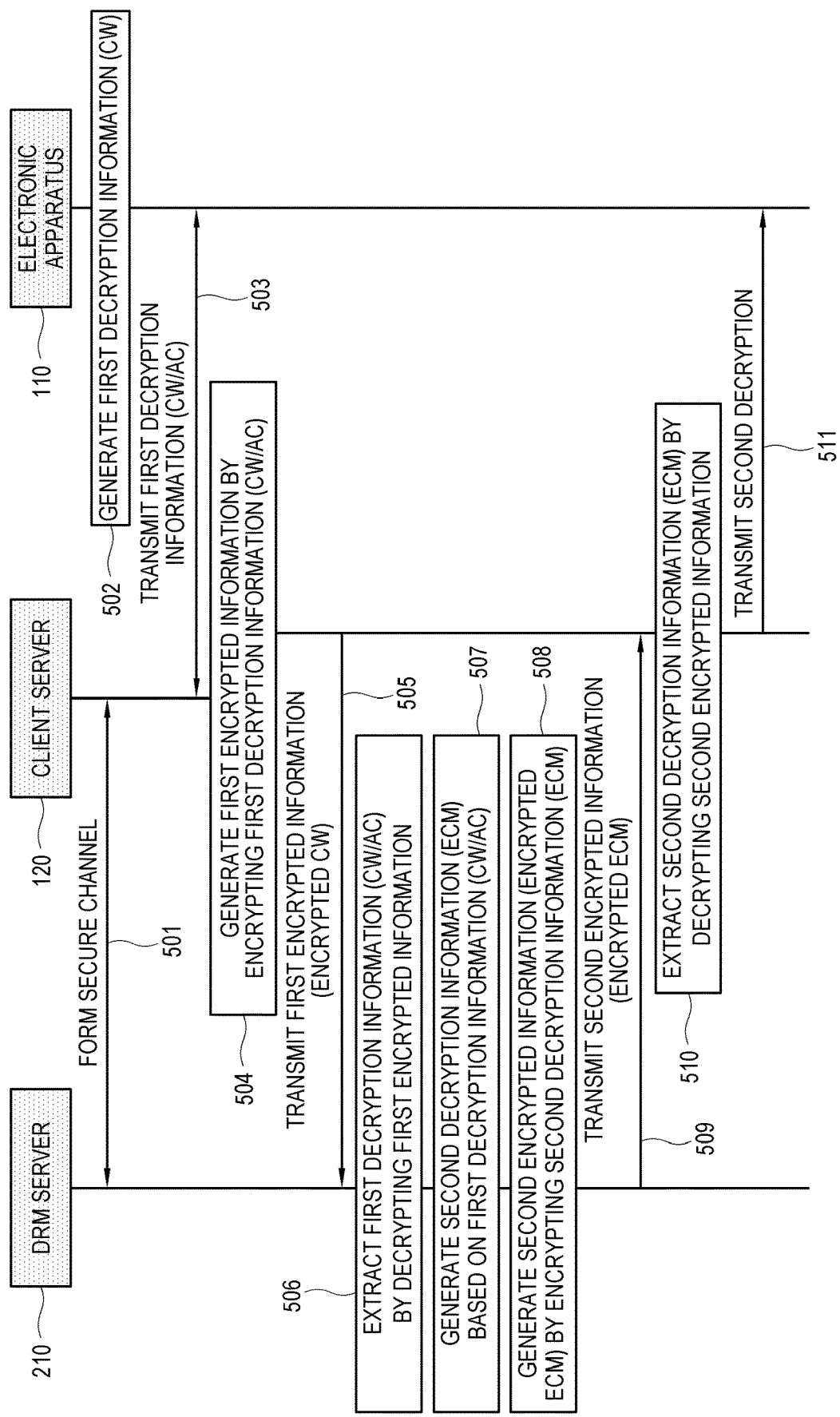
FIG. 4 illustrates a method of controlling the system configured according to the first embodiment.
Figure 5:
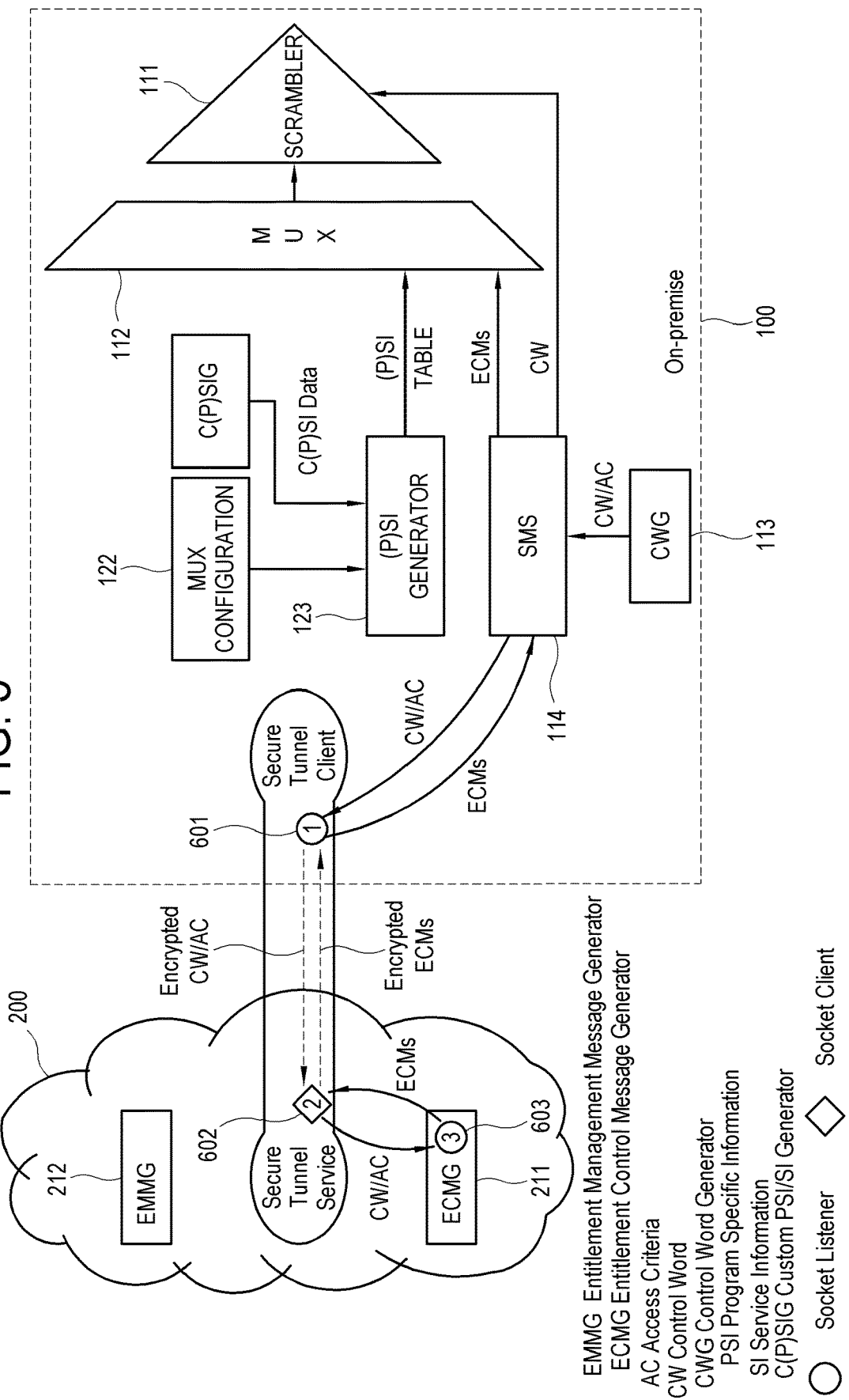
FIG. 5 illustrates a method of controlling the system configured according to the first embodiment.

As shown in FIG. 4, a secure channel is formed for communication between the client server 120 of the on-premises form, i.e., the first communication network 100, and the DRM server 210 of the cloud form, i.e., the second communication network 200 (operation 501). Here, the client server 120 serving as the secure communication agent may access the DRM server 210 serving as the secure communication service to thereby form the secure channel. In other words, an access direction of a transmission control protocol (TCP) packet is oriented from the on-premises toward the cloud.

Referring to FIG. 5, the processor 217 of the DRM server 210 executes the secure tunnel services based on the secure module 218 in the DRM server 210, thereby creating a secure communication environment based on secure access between the DRM server 210 and the client server 120.

The processor 127 of the client server 120 controls the secure module 128 to add a secure tunnel client to the client server 120, thereby permitting the access to the secure tunnel service. Thus, the secure communication is possible without separately setting a firewall to an inbound packet accessing the first communication network 100.

As shown in FIG. 5, a port ① serving as a socket listener 601, to which the SCS 114 can have access, is added to the secure tunnel client. The socket listener 601 is generated in response to an access request of the SCS 114, and serves as a virtual server for the SCS 114 serving as a virtual client, thereby filling in for the role of the DRM server 210.

As described above, the socket listener 601 is generated at the secure communication agent, and a socket listener 801 is generated at the secure communication service described below with reference to FIG. 7, thereby setting up an interactive secure communication service between the client server 120 and the DRM server 210.

A port ② a serving as a socket client 602 corresponding to the socket listener 601 is added to the secure tunnel service. As shown in FIG. 5, a secure tunnel may be configured from the socket listener 601 in a section of the socket client 602.

Specifically, the SCS 114 is not directly connected to ECMG 211, but makes a request for accessing the socket listener 601 of the secure tunnel client. The secure tunnel client transmits this access request to the secure tunnel service. The secure tunnel service adds the socket client 602 filling in for the SCS 114 in response to the received access request, and makes a request for accessing the ECMG 211.

Therefore, a port ③ serving as a socket listener 603, to which the ECMG 211 can have access, is added to the secure tunnel service. The socket listener 603 serves as a virtual server for the ECMG 211 serving as a virtual client, thereby filling in for the role of the client server 120.

The processor 117 of the electronic apparatus 110 controls the CWG 113 to generate the CW (operation 502). Here, the generated CW is included in the first decryption information.

The CW generated in operation 502 is transmitted to the SCS 114, and output from the SCS 114 as the first decryption information together with the AC, so that the first decryption information CW/AC can be transmitted from the electronic apparatus 110 to the client server 120 (operation 503). Further, as shown in FIG. 5, the SCS 114 also outputs the CW to the scrambler 111, so that the scrambler 111 can scramble content based on the CW.

Specifically, the processor 117 of the electronic apparatus 110 controls the communicator 115 to transmit the first decryption information CW/AC output from the SCS 114 to the client server 120. The processor 127 of the client server 120 controls the communicator 125 to receive the first decryption information CW/AC. Here, because the electronic apparatus 110 and the client server 120 are located in the first communication network 100 secured against the outside, the first decryption information CW/AC is transmitted as a clear text message.

The processor 127 of the client server 120 controls the secure module 128 to generate the first encrypted information Encrypted CW/AC by encrypting the first decryption information CW/AC (operation 504).

The processor 127 controls the communicator 125 to transmit the first encrypted information Encrypted CW/AC encrypted in operation 504 to the DRM server 210 (operation 505).

Referring to FIG. 5, when the SCS 114 outputs the first decryption information CW/AC of the clear text, the first encrypted information Encrypted CW/AC is transmitted to the DRM server 210 in a section (i.e., a secure tunnel section) of the socket client 602 from the socket listener 601 that receives the access request from the SCS 114.

The processor 217 of the DRM server 210 controls the secure module 218 to extract the first decryption information CW/AC by decrypting the first encrypted information Encrypted CW/AC received from the client server 120 (operation 506). As shown in FIG. 5, the first decryption information CW/AC extracted in operation 506 may be transmitted from the socket client 602 to the ECMG 211 as a clear text message in the section of the socket listener 603.

The processor 217 controls the ECMG 211 to generate the second decryption information ECM as a response message, based on the first decryption information CW/AC (operation 507). The second decryption information ECM generated in the ECMG 211 is, as shown in FIG. 5, transmitted from the socket listener 603 to the socket client 602 as the clear text message in the section of the socket client 602.

The processor 217 of the DRM server 210 controls the secure module 218 to generate the second encrypted information Encrypted ECM by encrypting the second decryption information ECM generated in operation 507 (operation 508).

The processor 217 controls the communicator 215 to transmit the second encrypted information Encrypted ECM encrypted in operation 508 to the client server 120 (operation 509). Referring to FIG. 5, the second encrypted information Encrypted ECM is transmitted from the socket client 602 to the client server 120 in the section (i.e., the secure tunnel section) of the socket listener 601.

The processor 127 of the client server 120 controls the secure module 128 to extract the second decryption information ECM by decrypting the second encrypted information Encrypted ECM received from the DRM server 210 (operation 510).

The processor 127 controls the communicator 125 to transmit the second decryption information ECM extracted in operation 510 to the SCS 114 of the electronic apparatus 110 (operation 511). Referring to FIG. 5, the second decryption information ECM may be transmitted from the socket listener 601 to the SCS 114 as the clear text message in the section of the socket client 602.

The second decryption information ECM transmitted to the SCS 114 is transmitted to the display apparatus 130, so that the display apparatus 130 can obtain the first decryption information CW/AC based on the second decryption information ECM. Thus, communication security is ensured even though the CAS is serviced using the cloud, and compatibility with the existing apparatuses is high because the data is transmitted and received according to the DVB simulcrypt standards.

Next, operations related to transmission and reception of the third decryption information EMM according to the first embodiment are described with reference to FIGS. 6 and 7. FIG. 7 is applicable to not only the first embodiment, but also the second embodiment to be described later.

Figure 6:
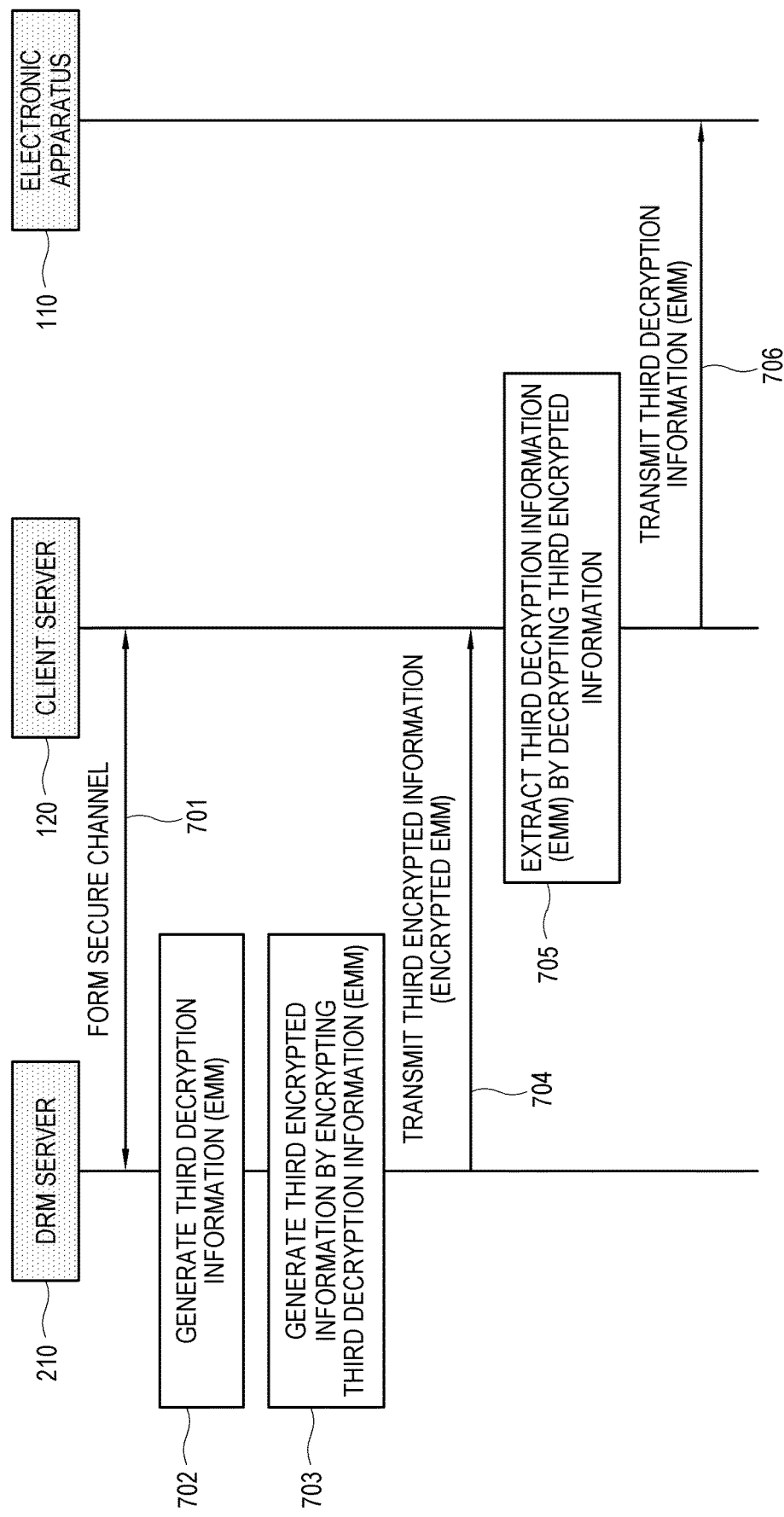
FIG. 6 illustrates a method of controlling the system configured according to the first embodiment.

As shown in FIG. 6, a secure channel is formed for communication between the client server 120 of the on-premises form, i.e., the first communication network 100, and the DRM server 210 of the cloud form, i.e., the second communication network 200 (operation 701). Here, the client server 120 serving as the secure communication agent may access the DRM server 210 serving as the secure communication service to thereby form the secure channel. In other words, an access direction of a TCP packet is oriented from the on-premises to the cloud.

Figure 7:
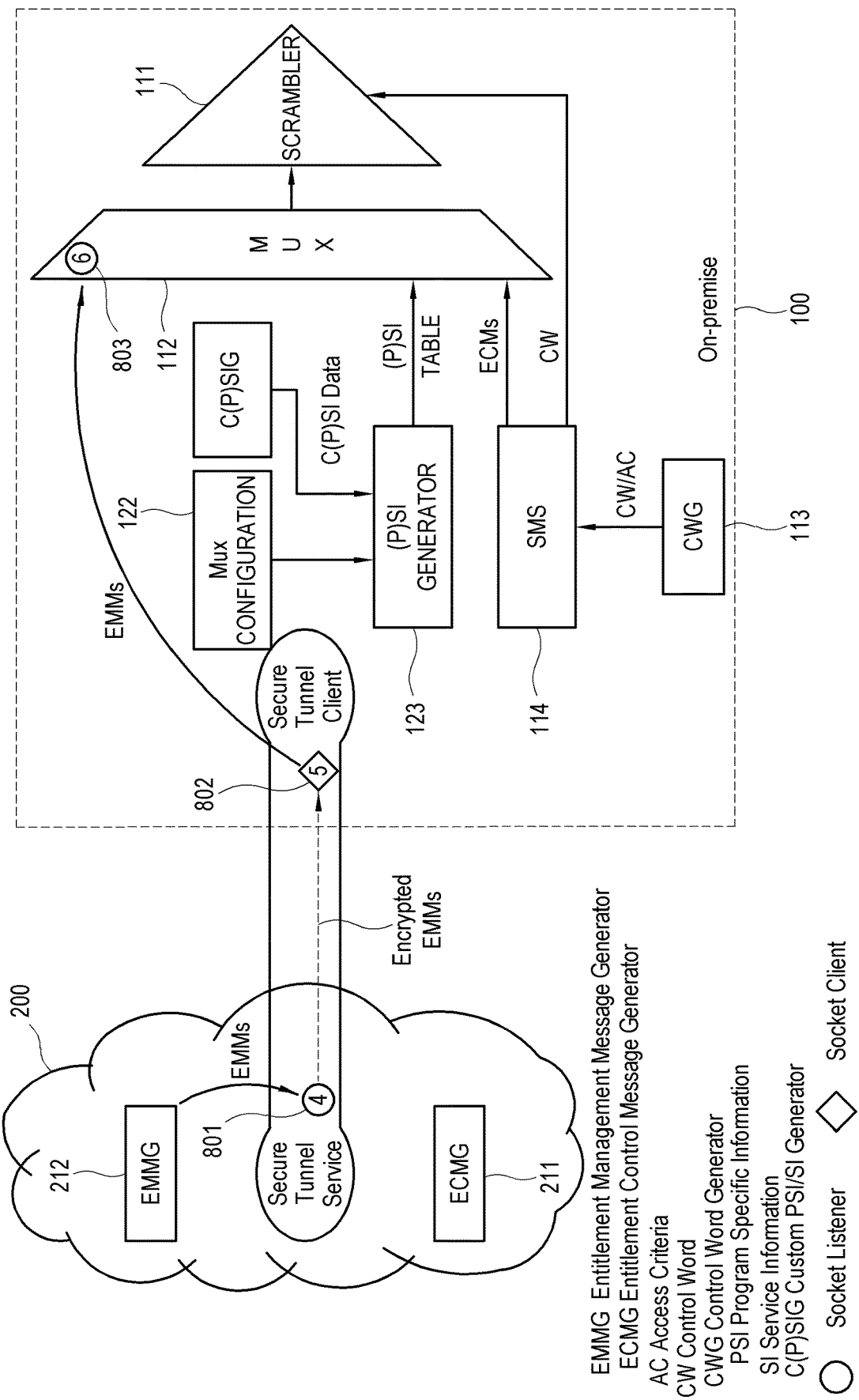
FIG. 7 illustrates a method of controlling the system configured according to the first embodiment.

Referring to FIG. 7, the processor 217 of the DRM server 210 executes the secure tunnel services based on the secure module 218 in the DRM server 210, thereby creating a secure communication environment based on secure access between the DRM server 210 and the client server 120. Thus, the DRM service is embodied using the secure tunneling that is easy to manage, thereby improving utilization.

The processor 127 of the client server 120 controls the secure module 128 to add a secure tunnel client to the client server 120, thereby permitting the access to the secure tunnel service. Thus, the secure communication is possible without separately setting a firewall to an inbound packet accessing the first communication network 100.

According to an embodiment, the secure channel in operation 701 may be formed when the secure channel is formed in operation 501 of FIG. 4, and the secure channel formed in operation 501 may be intactly used as necessary. However, there are no limits to the order of forming the secure channel according to the disclosure, and therefore the secure channel formed in operation 701 may be used in operation 501 as it is. Further, operation 501 and operation 701 may not be separated from each other, and it will be appreciated that the operation of forming the secure channel between the client server 120 and the DRM server 210 is performed more than once.

As shown in FIG. 7, a port ④ serving as a socket listener 801, to which the EMMG 212 can have an access, is added to the secure tunnel service. The socket listener 801 is generated in response to an access request of the EMMG 212, and serves as a virtual server for the EMMG 212 serving as a virtual client, thereby filling in for the role of the client server 120.

A port ⑤ serving as a socket client 802 corresponding to the socket listener 801 is added to the secure tunnel client.

As shown in FIG. 7, a secure tunnel may be configured in a section of the socket client 802 from the socket listener 801.

The socket listener 601 is generated at the secure communication agent as described above with reference to FIG. 5, and the socket listener 801 is generated at the secure communication service as above, thereby setting up an interactive secure communication service between the client server 120 and the DRM server 210.

Specifically, the EMMG 212 is not directly connected to the MUX 112, but makes a request for accessing the socket listener 801 of the secure tunnel service. The secure tunnel service transmits this access request to the secure tunnel client. The secure tunnel client adds the socket client 802 replacing the EMMG 212 in response to the received access request, and makes the access request to the MUX 112.

Therefore, a port ⑥ serving as a socket listener 803, to which the MUX 112 can have access, is added to the secure tunnel client. The socket listener 803 serves as a virtual server for the MUX 112 serving as a virtual client, thereby filling in for the role of the DRM server 210.

The processor 217 of the DRM server 210 controls the EMMG 212 to generate the third decryption information EMM (operation 702). The third decryption information EMM generated in the EMMG 212 is, as shown in FIG. 7, transmitted to the socket listener 801 as a clear text message.

The processor 217 of the DRM server 210 controls the secure module 218 to generate the third encrypted information Encrypted EMM by encrypting the third decryption information EMM generated in operation 702 (operation 703).

The processor 217 controls the communicator 215 to transmit the third encrypted information Encrypted EMM encrypted in operation 703 to the client server 120 (operation 704). Referring to FIG. 7, the third encrypted information Encrypted EMM is transmitted from the socket listener 801 to the client server 120 in a section (i.e., the secure tunnel section) of the socket client 802.

The processor 127 of the client server 120 controls the secure module 128 to extract the third decryption information EMM by decrypting the third encrypted information Encrypted EMM received from the DRM server 210 (operation 705).

The processor 127 controls the communicator 125 to transmit the third decryption information EMM extracted in operation 705 to the MUX 112 of the electronic apparatus 110 (operation 706). Referring to FIG. 7, the third decryption information EMM is transmitted as a clear text message from the socket client 802 to the MUX 112 in the section of the socket listener 803.

The third decryption information EMM transmitted to the MUX 112 is transmitted to the display apparatus 130, so that the display apparatus 130 can obtain the second decryption information ECM based on the third decryption information EMM.

Figure 8:
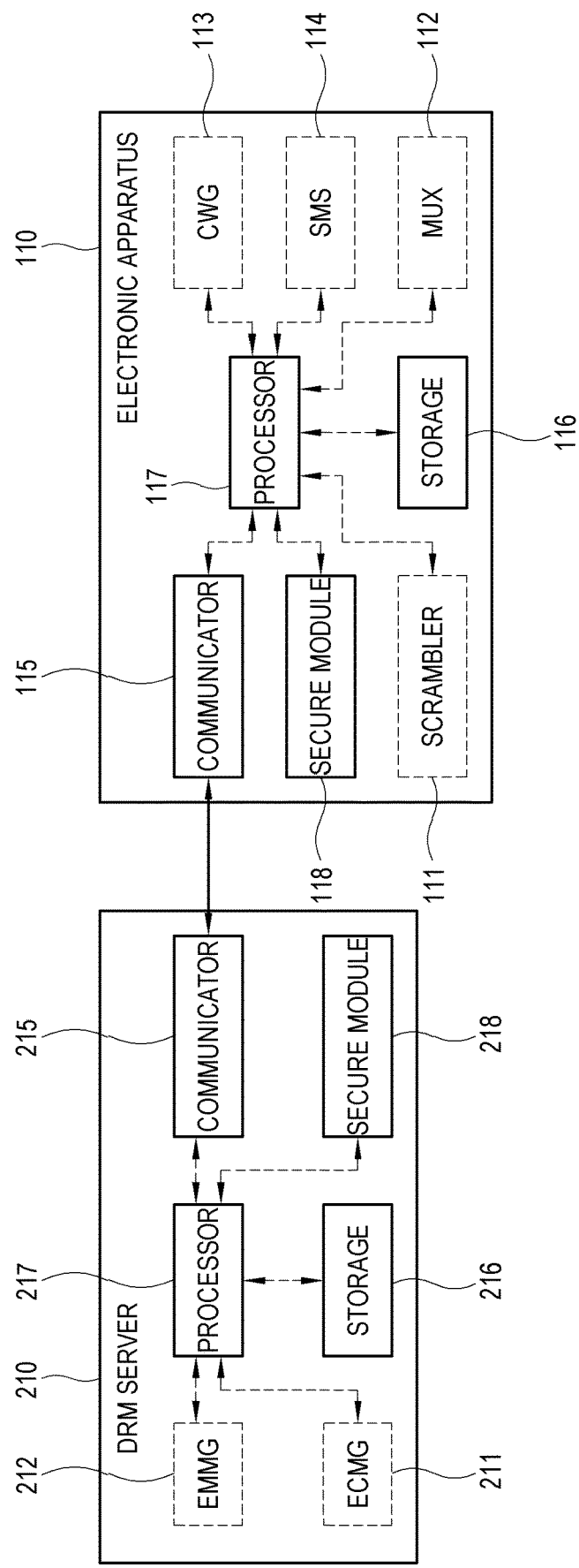
FIG. 8 is a block diagram of a system providing a CAS service according to a second embodiment.

FIG. 8 is a block diagram of a system providing a CAS service according to the second embodiment.

The system according to the second embodiment shown in FIG. 8 is characterized in that the electronic apparatus 110 and the DRM server 210 perform direct communication without the client server 120 for relaying communication between the electronic apparatus 110 and the DRM server 210, as compared with that of the first embodiment shown in FIG. 3.

Therefore, the same numerals and terms are used for embodiments, which are also provided in the first embodiment, among embodiments provided in the electronic apparatus 110 and the DRM server 210 according to the second embodiment, and details thereof are not described to avoid repetitive descriptions.

According to the second embodiment, the electronic apparatus 110 and the DRM server 210 are respectively provided with built-in secure modules 118 and 218, so that the electronic apparatus 110 can serve as a secure communication agent and the DRM server 210 can serve as a secure communication service. The secure communication service and the secure communication agent form a pair to provide a secure tunnel service.

As described above, the secure communication service is added to the area of the DRM server 210, and the secure communication agent is added to the area of the electronic apparatus 110, so that the electronic apparatus 110 can access the secure communication service executed in the DRM server 210 through a communicator 115.

As shown in FIG. 8, the system according to the second embodiment includes the electronic apparatus 110, and the DRM server 210.

As described with reference to FIG. 1, according to the second embodiment, the electronic apparatus 110 including the scrambler 111 is provided in the LAN, i.e., the first communication network 100 embodied as the on-premises network, and the DRM server 210 is provided in the second communication network 200 embodied as the cloud network.

The electronic apparatus 110 includes the scrambler 111, the MUX 112, the CWG 113, and the SCS 114. The operations/roles of these elements are the same as or similar to those described with reference to FIG. 2.

The electronic apparatus 110, as shown in FIG. 8, includes the communicator 115, a storage 116 and a processor 117 (e.g., at least one processor).

The communicator 115 performs communication with the DRM server 210.

There are no limits to the line through which the electronic apparatus 110 and the DRM server 210 can perform communication, and alternatively a public line or dedicated lines provided by various service businesses may be used in communication between the electronic apparatus 110 and the DRM server 210.

According to the second embodiment, the electronic apparatus 110, as shown in FIG. 8, includes a secure module 118.

The secure module 118 encrypts data transmitted to and received from the external server, i.e. the DRM server 210. Here, the data transmitted and received as encrypted includes the CW, the AC, the ECM, the EMM, etc.

The secure module 118 forms a secure communication channel between the electronic apparatus 110 and the DRM server 210, thereby exchanging the encrypted data with a communicator 215 of the DRM server 210 through the communicator 115.

According to an embodiment, the secure module 118 forms the secure communication channel based on a predetermined protocol, so that secured access can be achieved in the communicator 115, thereby allowing the communicator 115 to transmit and receive the encrypted data.

The secure module 118 may be embodied as an application or the like software module, and perform an operation to form the secure communication channel together with the DRM server 210 when executed by the processor 117. Therefore, it will be appreciated that the below described operation of the secure module 118 is performed by the processor 117.

The storage 116 is configured to store various pieces of data of the electronic apparatus 110. According to an embodiment, a secure application based on a predetermined secure protocol is stored and installed in the storage 116, so that the secure module 118 can operate as the installed application is executed.

The processor 117 performs control to operate general elements of the electronic apparatus 110.

Specifically, the processor 117 receives the first decryption information CW from the SCS 114, and controls the secure module 118 to generate the first encrypted information Encrypted CW by encrypting the received first decryption information CW. Here, the first decryption information output from the SCS 114 may further include the AC, and the processor 117 may generate the first encrypted information Encrypted CW/AC by encrypting the first decryption information CW/AC.

The processor 117 controls the communicator 115 to transmit the generated first encrypted information Encrypted CW/AC to the external server, i.e., the DRM server 210.

The processor 117 controls the communicator 115 to receive the second encrypted information Encrypted ECM, generated based on the first decryption information CW/AC, from the DRM server 210.

The processor 117 controls the secure module 118 to decrypt the second encrypted information Encrypted ECM received from the external server, i.e., the DRM server 210, and generate the second decryption information ECM by decrypting the second encrypted information Encrypted ECM.

Further, the processor 117 controls the communicator 115 to receive the third encrypted information Encrypted EMM from the DRM server 210.

The processor 117 controls the secure module 118 to decrypt the third encrypted information Encrypted EMM received from the external server, i.e., the DRM server 210, and generate the third decryption information EMM by decrypting the third encrypted information Encrypted EMM.

The processor 117 may control the communicator 115 to transmit and receive the first encrypted information Encrypted CW, the second encrypted information Encrypted ECM, and the third encrypted information Encrypted EMM between the electronic apparatus 110 and the DRM server 210 through the secure communication channel formed by the operation of the secure module 118.

The DRM server 210 includes the ECMG 211 and the EMMG 212. The operations/roles of these elements are the same as those described with reference to FIG. 2.

The DRM server 210, as shown in FIG. 8, includes the communicator 215, a storage 216 and a processor 217.

The communicator 215 performs communication with the electronic apparatus 110.

There are no limits to the line through which the electronic apparatus 110 and the DRM server 210 can perform communication, and alternatively a public line or dedicated lines provided by various service businesses may be used in communication between the electronic apparatus 110 and the DRM server 210.

According to the second embodiment, the DRM server 210, as shown in FIG. 8, includes the secure module 218.

The secure module 218 encrypts data transmitted to and received from the external apparatus, i.e. the electronic apparatus 110. Here, the data transmitted and received as encrypted includes the CW, the AC, the ECM, the EMM, etc.

The secure module 218 forms a secure communication channel between the DRM server 210 and the electronic apparatus 110, thereby exchanging the encrypted data with the communicator 115 of the electronic apparatus 110 through the communicator 215.

According to an embodiment, the secure module 218 forms the secure communication channel based on a predetermined protocol, so that secured access can be achieved in the communicator 215, thereby allowing the communicator 215 to transmit and receive the encrypted data.

The secure module 218 may be embodied as an application or the like software module, and perform an operation to form the secure communication channel together with the electronic apparatus 110 when executed by the processor 217. Therefore, it will be appreciated that the below described operation of the secure module 218 is performed by the processor 217.

The storage 216 is configured to store various pieces of data of the DRM server 210.

According to an embodiment, a secure application based on a predetermined secure protocol is stored and installed in the storage 216, so that the secure module 218 can operate as the installed application is executed.

The processor 217 performs control to operate general elements of the DRM server 210.

Specifically, the processor 217 controls the communicator 215 to receive the first encrypted information Encrypted CW/AC from the electronic apparatus 110.

The processor 217 controls the secure module 218 to decrypt the first encrypted information Encrypted CW/AC received from the external apparatus, i.e., the electronic apparatus 110, and to generate the first decryption information CW/AC by decrypting the first encrypted information Encrypted CW/AC.

The processor 217 controls the ECMG 211 to generate the second decryption information ECM based on the first decryption information CW/AC.

The processor 217 controls the secure module 218 to encrypt the second decryption information ECM generated by the ECMG 211, and generate the second encrypted information Encrypted ECM.

The processor 217 controls the communicator 215 to transmit the generated second encrypted information Encrypted ECM to the external server, i.e., the electronic apparatus 110.

Further, the processor 217 controls the EMMG 212 to generate the third decryption information EMM.

The processor 217 controls the secure module 218 to encrypt the third decryption information EMM generated by the EMMG 211, and generate the third encrypted information Encrypted EMM.

The processor 217 controls the communicator 215 to transmit the generated third encrypted information Encrypted EMM to the external server, i.e., the electronic apparatus 110.

The processor 217 may control the communicator 215 to transmit and receive the first encrypted information Encrypted CW, the second encrypted information Encrypted ECM, and the third encrypted information Encrypted EMM between the DRM server 210 and the electronic apparatus 110 through the secure communication channel formed by the operation of the secure module 218.

Figure 9:
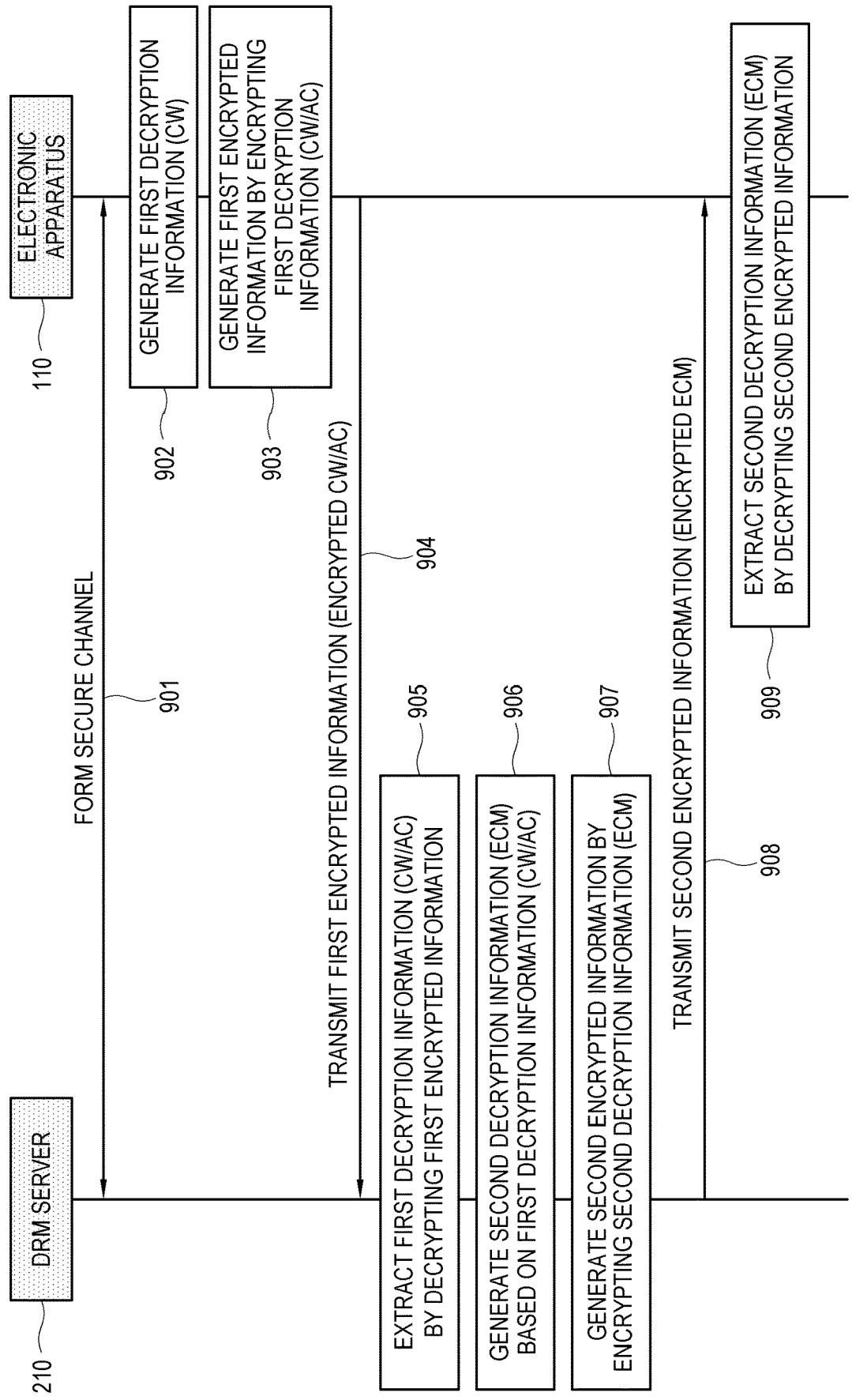
FIG. 9 illustrates a method of controlling the system configured according to the second embodiment.
Figure 10:
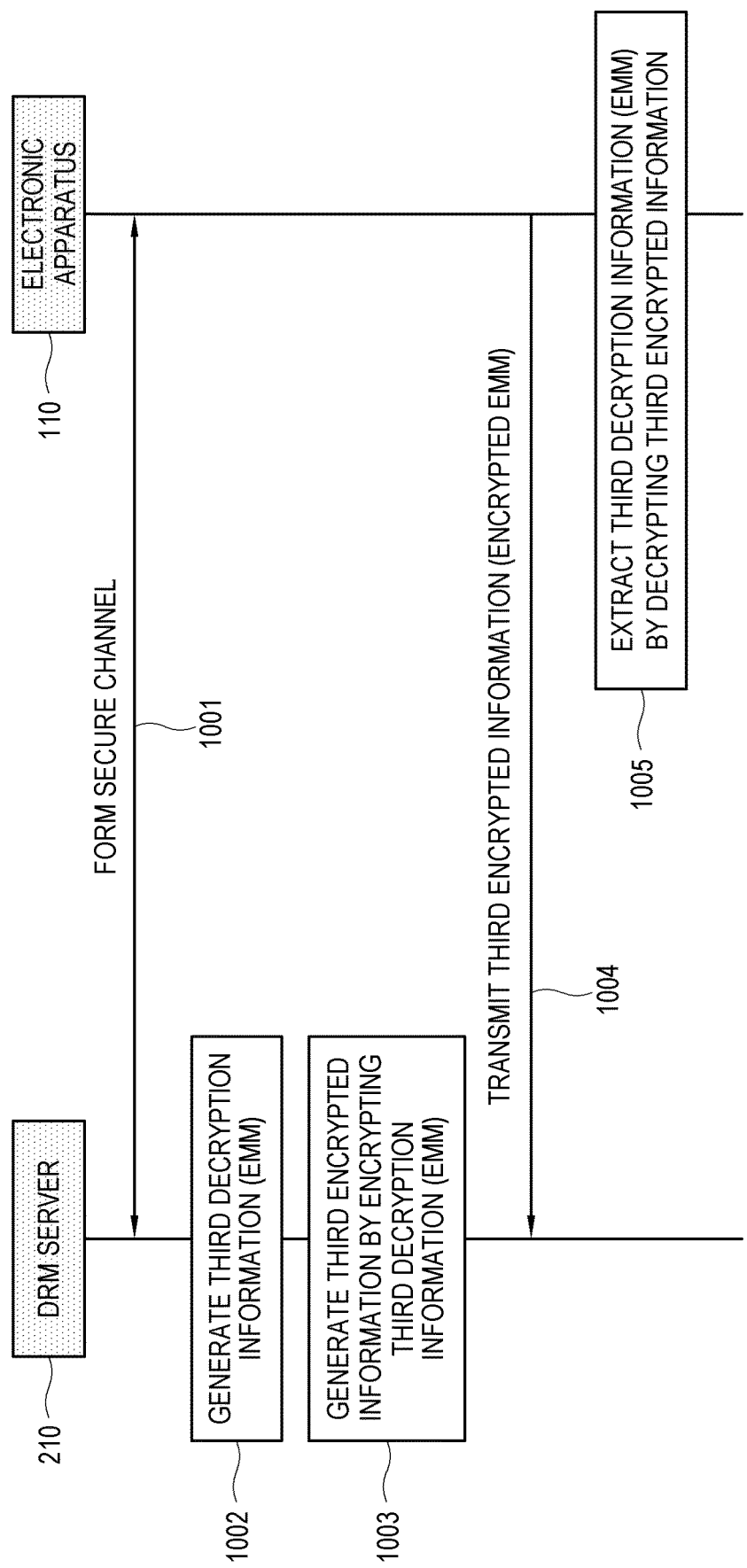
FIG. 10 illustrates a method of controlling the system configured according to the second embodiment.

FIGS. 9 and 10 illustrate a method of controlling the system with the foregoing configuration according to the second embodiment.

First, an operation related to transmission and reception of the first decryption information CW/AC and the second decryption information ECM according to the second embodiment is described below with reference to FIGS. 9 and 5.

As shown in FIG. 9, a secure channel is formed for communication between the electronic apparatus 110 of the on-premises form, i.e., the first communication network 100, and the DRM server 210 of the cloud form, i.e., the second communication network 200 (operation 901). Here, the electronic apparatus 110 serving as the secure communication agent may access the DRM server 210 serving as the secure communication service to thereby form the secure channel. In other words, an access direction of a TCP packet is oriented from the on-premises toward the cloud.

Referring to FIG. 5, the processor 217 of the DRM server 210 executes the secure tunnel services based on the secure module 218 in the DRM server 210, thereby creating a secure communication environment based on secure access between the DRM server 210 and the electronic apparatus 110.

The processor 117 of the electronic apparatus 110 controls the secure module 118 to add a secure tunnel client to the electronic apparatus 110, thereby permitting the access to the secure tunnel service. Thus, the secure communication is possible without separately setting a firewall to an inbound packet accessing the first communication network 100.

As shown in FIG. 5, a port ① serving as a socket listener 601, to which the SCS 114 can have access, is added to the secure tunnel client. The socket listener 601 is generated in response to an access request of the SCS 114, and serves as a virtual server for the SCS 114 serving as a virtual client, thereby filling in for the role of the DRM server 210. As described above, the socket listener 601 is generated at the secure communication agent, and the socket listener 801 is generated at the secure communication service as shown in FIG. 7, thereby setting up an interactive secure communication service between the electronic apparatus 110 and the DRM server 210.

A port ② a serving as the socket client 602 corresponding to the socket listener 601 is added to the secure tunnel service. As shown in FIG. 5, a secure tunnel may be configured in the section of the socket client 602 from the socket listener 601.

Specifically, the SCS 114 is not directly connected to ECMG 211, but makes a request for accessing the socket listener 601 of the secure tunnel client. The secure tunnel client transmits this access request to the secure tunnel service. The secure tunnel service adds the socket client 602 filling in for the SCS 114 in response to the received access request, and makes a request for accessing the ECMG 211.

Therefore, a port ③ serving as the socket listener 603, to which the ECMG 211 can have access, is added to the secure tunnel service. The socket listener 603 serves as a virtual server for the ECMG 211 serving as a virtual client, thereby filling in for the role of the electronic apparatus 110.

The processor 117 of the electronic apparatus 110 controls the CWG 113 to generate the CW (operation 902). The CW generated in the operation 902 is transmitted to the SCS 114, and output from the SCS 114 to the ECMG 211 as the first decryption information together with the AC. The SCS 114 also outputs the CW to the scrambler 111, so that the scrambler 111 can scramble content based on the CW.

The processor 117 of the electronic apparatus 110 controls the secure module 118 to generate the first encrypted information Encrypted CW/AC by encrypting the first decryption information CW/AC (operation 903).

The processor 117 controls the communicator 115 to transmit the first encrypted information Encrypted CW/AC encrypted in the operation 903 to the DRM server 210 (operation 904).

Referring to FIG. 5, when the SCS 114 outputs the first decryption information CW/AC of the clear text, the first encrypted information Encrypted CW/AC is transmitted to the DRM server 210 in the section (i.e., the secure tunnel section) of the socket client 602 from the socket listener 601 that receives the access request from the SCS 114.

The processor 217 of the DRM server 210 controls the secure module 218 to extract the first decryption information CW/AC by decrypting the first encrypted information Encrypted CW/AC received from the electronic apparatus 110 (operation 905). As shown in FIG. 5, the first decryption information CW/AC extracted in the operation 905 may be transmitted from the socket client 602 to the ECMG 211 as the clear text message in the section of the socket listener 603.

The processor 217 controls the ECMG 211 to generate the second decryption information ECM as a response message, based on the first decryption information CW/AC (operation 906). The second decryption information ECM generated in the ECMG 211 is, as shown in FIG. 5, transmitted from the socket listener 603 to the socket client 602 as the clear text message in the section of the socket client 602.

The processor 217 of the DRM server 210 controls the secure module 218 to generate the second encrypted information Encrypted ECM by encrypting the second decryption information ECM generated in operation 906 (operation 907).

The processor 217 controls the communicator 215 to transmit the second encrypted information Encrypted ECM encrypted in operation 907 to the electronic apparatus 110 (operation 908). Referring to FIG. 5, the second encrypted information Encrypted ECM is transmitted from the socket client 602 to the electronic apparatus 110 in the section (i.e., the secure tunnel section) of the socket listener 601.

The processor 117 of the electronic apparatus 110 controls the secure module 118 to extract the second decryption information ECM by decrypting the second encrypted information Encrypted ECM received from the DRM server 210 (operation 909).

The second decryption information ECM extracted in operation 909 is transmitted to the SCS 114.

The second decryption information ECM transmitted to the SCS 114 is transmitted to the display apparatus 130, so that the display apparatus 130 can obtain the first decryption information CW/AC based on the second decryption information ECM. Thus, communication security is ensured even though the CAS is serviced using the cloud, and compatibility with related art apparatuses is high because the data is transmitted and received according to the DVB simulcrypt standards.

Next, an operation related to transmission and reception of the third decryption information EMM according to the second embodiment is described below with reference to FIGS. 10 and 7.

As shown in FIG. 10, a secure channel is formed for communication between the electronic apparatus 110 of the on-premises form, i.e. the first communication network 100 and the DRM server 210 of the cloud form, i.e. the second communication network 200 (operation 1001). Here, the electronic apparatus 110 serving as the secure communication agent may access the DRM server 210 serving as the secure communication service to thereby form the secure channel. In other words, an access direction of a TCP packet is oriented from the on-premises toward the cloud.

Referring to FIG. 10, the processor 217 of the DRM server 210 executes the secure tunnel services based on the secure module 218 in the DRM server 210, thereby making a secure communication environment based on secure access between the DRM server 210 and the electronic apparatus 110. Thus, the DRM service is embodied using the secure tunneling that is easy to manage, thereby improving utilization.

The processor 117 of the electronic apparatus 110 controls the secure module 118 to add a secure tunnel client to the electronic apparatus 110, thereby permitting the access to the secure tunnel service. Thus, the secure communication is possible without separately setting a firewall to an inbound packet accessing the first communication network 100.

According to an embodiment, the secure channel in operation 1001 may be formed when the secure channel is formed in operation 901 of FIG. 9, and the secure channel formed in operation 901 may be intactly used as necessary. However, there are no limits to the order of forming the secure channel according to the disclosure, and therefore the secure channel formed in operation 1001 may be used in operation 901 as it is. Further, operation 901 and operation 1001 may not be separated from each other, and it will be appreciated that the operation of forming the secure channel between the electronic apparatus 110 and the DRM server 210 is performed more than once.

As shown in FIG. 7, a port ④ serving as the socket listener 801, to which the EMMG 212 can have access, is added to the secure tunnel service. The socket listener 801 is generated in response to an access request of the EMMG 212, and serves as a virtual server for the EMMG 212 serving as a virtual client, thereby filling in for the role of the electronic apparatus 110.

A port ⑤ serving as the socket client 802 corresponding to the socket listener 801 is added to the secure tunnel client. As shown in FIG. 7, the secure tunnel may be configured in the section of the socket client 802 from the socket listener 801.

The socket listener 601 is generated at the secure communication agent as described above with reference to FIG. 5, and the socket listener 801 is generated at the secure communication service as above, thereby setting up an interactive secure communication service between the electronic apparatus 110 and the DRM server 210.

Specifically, the EMMG 212 is not directly connected to the MUX 112, but makes a request for accessing the socket listener 801 of the secure tunnel service. The secure tunnel service transmits this access request to the secure tunnel client. The secure tunnel client adds the socket client 802 replacing the EMMG 212 in response to the received access request, and makes the access request to the MUX 111.

Therefore, a port ⑥ serving as the socket listener 803, to which the MUX 111 can have an access, is added to the secure tunnel client. The socket listener 803 serves as a virtual server for the MUX 112 serving as a virtual client, thereby filling in for the role of the DRM server 210.

The processor 217 of the DRM server 210 controls the EMMG 212 to generate the third decryption information EMM (operation 1002). The third decryption information EMM generated in the EMMG 212 is, as shown in FIG. 7, transmitted to the socket listener 801 as a clear text message.

The processor 217 of the DRM server 210 controls the secure module 218 to generate the third encrypted information Encrypted EMM by encrypting the third decryption information EMM generated in operation 1002 (operation 1003).

The processor 217 controls the communicator 215 to transmit the third encrypted information Encrypted EMM encrypted in operation 1003 to the electronic apparatus 110 (operation 1004). Referring to FIG. 7, the third encrypted information Encrypted EMM is transmitted from the socket listener 801 to the electronic apparatus 110 in the section (i.e., the secure tunnel section) of the socket client 802.

The processor 117 of the electronic apparatus 110 controls the secure module 118 to extract the third decryption information EMM by decrypting the third encrypted information Encrypted EMM received from the DRM server 210 (operation 1005). The third decryption information EMM extracted in operation 1005 is transmitted to the MUX 112

The third decryption information EMM transmitted to the MUX 112 is transmitted to the display apparatus 130, so that the display apparatus 130 can obtain the second decryption information ECM based on the third decryption information EMM.

Below, it is described that the system providing the CAS service according to the foregoing embodiments is actually realized in a hotel and the like environments.

According to embodiments, the DRM server 210 embodied in the cloud exchanges data with the electronic apparatus 100 including the plurality of client servers 120 or the scrambler 111 through the secure channel, so that some configurations of the CAS head-end can provide the DRM service using the cloud.

Figure 11:
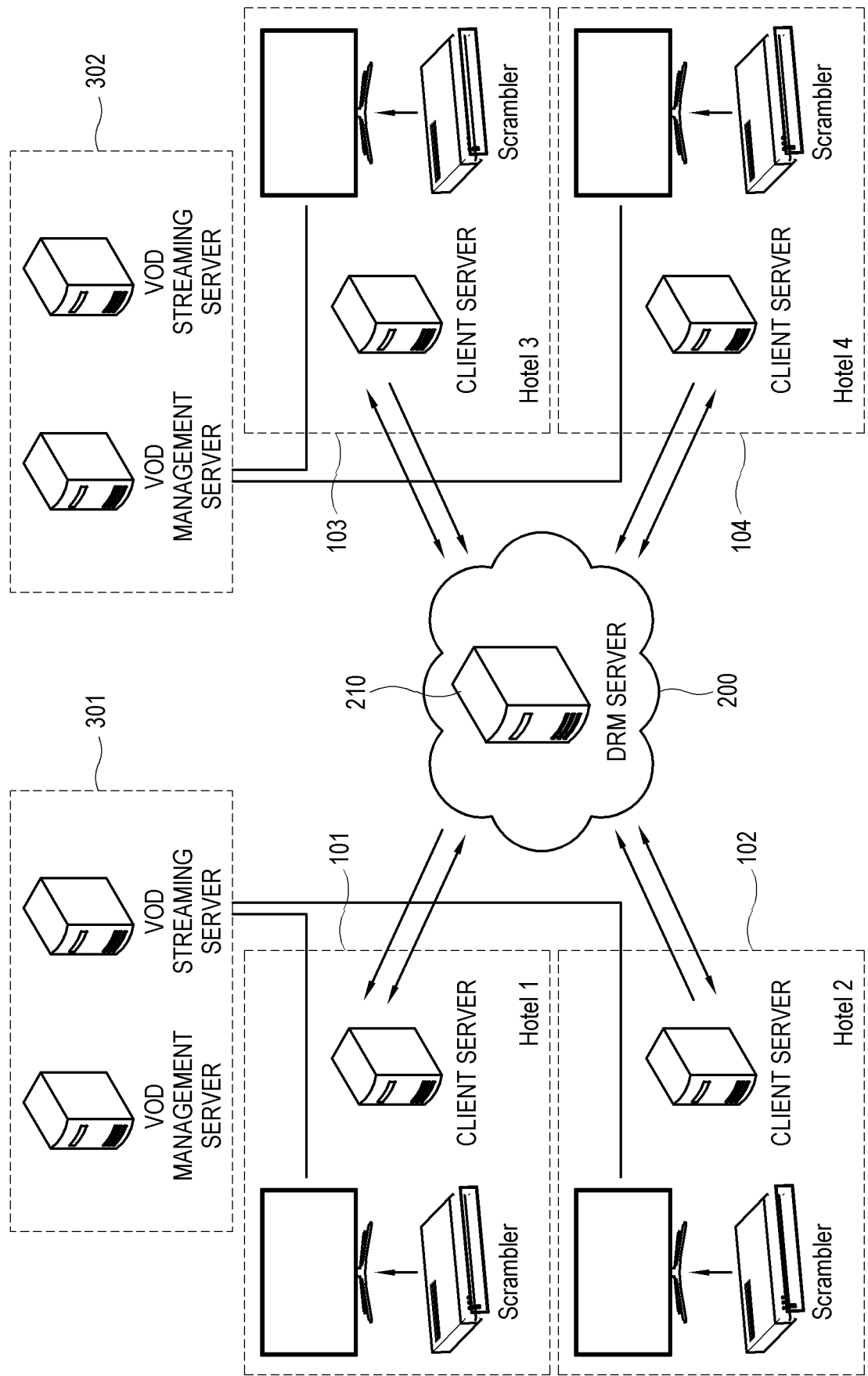
FIG. 11 illustrates a system providing a CAS service in a cloud environment according to an embodiment.

FIG. 11 illustrates a system providing a CAS service in a cloud environment according to an embodiment.

In FIG. 11, the CAS service is used in hotels by way of example. However, the CAS service according to the disclosure may be applied to various sites, which can employ the CAS, other than a hotel. Further, the CAS environment according to the disclosure is not limited to that shown in FIG. 11, and therefore one or more configurations or components may be added or excluded.

As shown in FIG. 11, LANs 101, 102, 103 and 104 secured against the outside are respectively built on hotel sites in environments where the plurality of hotels Hotel 1, Hotel 2, Hotel 3 and Hotel 4 employ the CAS service.

Here, the hotels Hotel 1, Hotel 2, Hotel 3 and Hotel 4 may receive a VOD service from the same media operator, i.e., SI business, or VOD services from different SI businesses. In other words, there are no limits to the number or kind of SI businesses in the CAS environment.

FIG. 11 shows an example in which the LAN 101 of a first hotel Hotel 1 and the LAN 102 of a second hotel Hotel 2 are connected to a LAN 301 of a first SI business and receive a VOD service from the first SI business. Further, the LAN 103 of a third hotel Hotel 3 and the LAN 104 of a fourth hotel Hotel 4 are connected to a LAN 302 of a second SI business and receive a VOD service from the second SI business.

The DRM server 210 is provided in the second communication network 200 embodied in the public cloud, and the second communication network 200 performs secure connection with the different LANs 101, 102, 103 and 104 of the plurality of hotels Hotel 1, Hotel 2, Hotel 3 and Hotel 4 and exchanges the encrypted data, i.e., the first encrypted information Encrypted CW/AC, the second encrypted information Encrypted ECM, and the third encrypted information Encrypted EMM with each of the different LANs 101, 102, 103 and 104.

Each of the LANs 101, 102, 103 and 104 of the hotels Hotel 1, Hotel 2, Hotel 3 and Hotel 4 may be provided with the client server 120 including the secure module 128 described in the first embodiment with reference to FIG. 3. Therefore, the communication channel is formed as the secure tunnel between the DRM server 210 in which a secure tunnel service is executed and the client server 120 to which a corresponding secure tunnel client is added, thereby performing secure communication in between.

However, according to the second embodiment described above with reference to FIG. 8, each of the hotel LANs 101, 102, 103 and 104 may not separately include the client server, but software, i.e., the secure module 118, may be installed in the electronic apparatus 110. Therefore, the communication channel is formed as the secure tunnel between the DRM server 210 in which the secure tunnel service is executed and the electronic apparatus 110 to which a corresponding secure tunnel client is added, thereby performing secure communication in between.

In FIG. 11, each of the LANs 101, 102, 103 and 104 of the hotels Hotel 1, Hotel 2, Hotel 3 and Hotel 4 is provided with the client server 120 by way of example. Therefore, the LAN of at least one hotel may not be provided with the client server. In other words, some hotels may employ the client server 120 to receive the DRM service from the DRM server 210, and other hotels may employ the electronic apparatus 110 to receive the DRM service from the DRM server 210.

The DRM solution business that manages the DRM server 210 may provide the DRM service through the separate client server 120 by making a contract with hotel operators of the hotels Hotel 1, Hotel 2, Hotel 3 and Hotel 4, or may provide the DRM service with enhanced security to the hotels Hotel 1, Hotel 2, Hotel 3 and Hotel 4 employing the CAS service by installing the secure module 118 in the electronic apparatus 110 including the scrambler 111.

As described above, in an electronic apparatus, a server, and a method of controlling the same according to various embodiments, a secured communication channel is formed together with a server of a cloud in which some configurations of a CAS head-end are provided, and encrypted data is transmitted and received, thereby ensuring communication security while a CAS is serviced using a public cloud.

Further, data is transmitted and received according to DVB simulcrypt standards, and thus related art CAS apparatuses are compatibly usable without replacement, thereby improving utilization and reducing costs.

Although a few embodiments have been shown and described, it will be appreciated by those skilled in the art that changes may be made in these embodiments without departing from the principles and spirit of the inventive concept(s), the scope of which is defined in at least the appended claims and their equivalents.

What is claimed is:

1. A server comprising:
a communicator configured to connect with an electronic apparatus and an external server; and
a processor configured to:
provide first encrypted information by encrypting first decryption information received from the electronic apparatus, the first decryption information for reproducing content,
control the communicator to transmit, to the external server, the provided first encrypted information,
provide second decryption information by decrypting second encrypted information received from the external server, the second encrypted information provided based on the first decryption information, and
control the communicator transmit the provided second decryption information to the electronic apparatus to scramble the content by a scrambler of the electronic apparatus.

2. The server according to claim 1, wherein:
the first decryption information comprises a control word for scrambling the content in the scrambler; and
the processor is further configured to receive, via the communicator, the first decryption information output from a simulcrypt synchronizer of the electronic apparatus.

3. The server according to claim 2, wherein the processor is further configured to add a secure tunnel client to the server to give the server an access, through the communicator, to a secure tunnel service executed in the external server.

4. The server according to claim 3, wherein a socket listener is added to the secure tunnel client, and serves as a virtual server for the simulcrypt synchronizer.

5. The server according to claim 3, wherein:
the second decryption information comprises an entitlement control message with information to extract the control word; and
the processor is further configured to control to output, via the communicator, the second decryption information to the simulcrypt synchronizer.

6. The server according to claim 3, wherein the processor is further configured to provide third decryption information by decrypting third encrypted information received from the external server, and control the communicator to transmit, to the electronic apparatus, the provided third decryption information.

7. The server according to claim 6, wherein:
the third decryption information comprises an entitlement management message with information to decrypt the second decryption information; and
the processor is further configured to control to output, via the communicator, the third decryption information to a multiplexer of the electronic apparatus.

8. The server according to claim 7, wherein a socket listener is added to the secure tunnel client, and serves as a virtual server for the multiplexer.

9. A server comprising:
a communicator configured to connect with an external server; and
a processor configured to:
receive, from the external server via the communicator, first encrypted information, which is provided by encrypting first decryption information for reproducing content,
extract the first decryption information by decrypting the received first encrypted information,
provide second decryption information based on the extracted first decryption information,
provide second encrypted information by encrypting the second decryption information, and
control the communicator to transmit the provided second encrypted information to the external server to scramble the content.

10. The server according to claim 9, wherein:
the first decryption information comprises a control word to scramble the content in a scrambler;
the second decryption information comprises an entitlement control message with information to extract the control word; and
the processor is further configured to output the extracted first decryption information to an entitlement control message generator that generates the entitlement control message based on the control word.

11. The server according to claim 10, wherein the processor is further configured to execute a secure tunnel service in the server to give the server an access, through the communicator, to a secure tunnel client added to the external server.

12. The server according to claim 11, wherein a socket listener is added to the secure tunnel service, and serves as a virtual server for the entitlement control message generator.

13. The server according to claim 11, wherein the processor is further configured to:
provide third encrypted information by encrypting third decryption information; and
control the communicator to transmit, to the external server, the provided third encrypted information.

14. The server according to claim 13, wherein:
the third decryption information comprises an entitlement management message with information to decrypt the second decryption information; and
the processor is further configured to obtain the entitlement management message from an entitlement management message generator.

15. The server according to claim 14, wherein a socket listener is added to the secure tunnel service, and serves as a virtual server for the entitlement management message generator.

16. An electronic apparatus comprising:
a scrambler;
a communicator configured to connect with a server; and
a processor configured to:
provide first encrypted information by encrypting first decryption information for reproducing content,
control the communicator to transmit, to the server, the provided first encrypted information,
provide second decryption information by decrypting second encrypted information received from the server, the second encrypted information provided based on the first decryption information, and
control the scrambler to scramble the content based on the provided second decryption information.

17. A server comprising:
a communicator configured to connect with an electronic apparatus; and
a processor configured to:
receive, from the electronic apparatus via the communicator, first encrypted information, which is provided by encrypting first decryption information for reproducing content,
extract the first decryption information by decrypting the received first encrypted information,
provide second decryption information based on the extracted first decryption information,
provide second encrypted information by encrypting the second decryption information, and
control the communicator to transmit, to the electronic apparatus, the provided second encrypted information to scramble the content by a scrambler of the electronic apparatus.

18. A method of controlling a server, the method comprising:
generating first encrypted information by encrypting first decryption information received from an electronic apparatus comprising a scrambler, the first decryption information for reproducing content;
transmitting, to an external server, the provided first encrypted information;
generating second decryption information by decrypting second encrypted information received from the external server, the second encrypted information provided based on the first decryption information; and
transmitting the provided second decryption information to the electronic apparatus to scramble the content.

19. A method of controlling a server, the method comprising:
receiving, from an external server, first encrypted information provided by encrypting first decryption information for reproducing content;
extracting the first decryption information by decrypting the received first encrypted information;
generating second decryption information based on the extracted first decryption information;
generating second encrypted information by encrypting the second decryption information; and
transmitting the provided second encrypted information to the external server to scramble the content.

20. A method of controlling an electronic apparatus, the method comprising:
generating first encrypted information by encrypting first decryption information for reproducing content scrambled in a scrambler;
transmitting, to a server, the provided first encrypted information;
generating second decryption information by decrypting second encrypted information received from the server, the second encrypted information provided based on the first decryption information; and
controlling the scrambler to scramble the content based on the provided second decryption information.

21. A method of controlling a server, the method comprising:
receiving, from an electronic apparatus comprising a scrambler, first encrypted information provided by encrypting first decryption information for reproducing content;
extracting the first decryption information by decrypting the received first encrypted information;
generating second decryption information based on the extracted first decryption information;
generating second encrypted information by encrypting the second decryption information; and
transmitting the provided second encrypted information to the electronic apparatus to scramble the content.

* * * * *